US009497057B2

(12) United States Patent
You et al.

(10) Patent No.: US 9,497,057 B2
(45) Date of Patent: Nov. 15, 2016

(54) METHOD FOR PERFORMING CHANNEL SOUNDING IN WIRELESS LAN SYSTEM AND APPARATUS

(71) Applicant: LG ELECTRONICS INC., Seoul (KR)

(72) Inventors: Hyang Sun You, Anyang-si (KR); Yong Ho Seok, Anyang-si (KR); Jong Hyun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 149 days.

(21) Appl. No.: 14/362,860

(22) PCT Filed: Dec. 6, 2012

(86) PCT No.: PCT/KR2012/010507

§ 371 (c)(1),
(2) Date: Jun. 4, 2014

(87) PCT Pub. No.: WO2013/085289

PCT Pub. Date: Jun. 13, 2013

(65) Prior Publication Data

US 2014/0334420 A1 Nov. 13, 2014

Related U.S. Application Data

(60) Provisional application No. 61/567,600, filed on Dec. 6, 2011.

(51) Int. Cl.
*H04L 27/26* (2006.01)
*H04L 25/02* (2006.01)
(Continued)

(52) U.S. Cl.
CPC .......... *H04L 27/2607* (2013.01); *H04L 5/005* (2013.01); *H04L 25/0204* (2013.01);
(Continued)

(58) Field of Classification Search
CPC .... H04B 7/00; H04B 7/0413; H04B 7/0452; H04B 7/0617; H04B 7/0626; H04B 7/0634; H04B 7/0636; H04B 7/0697; H04B 17/21; H04B 17/0062; H04J 11/00; H04J 2011/0096; H04L 5/0007; H04L 5/14; H04L 5/0023; H04L 5/0048; H04L 5/0053; H04L 5/0055; H04L 5/1438; H04L 12/28; H04L 27/2602; H04L 27/2656; H04W 24/00; H04W 48/20; H04W 72/0446; H04W 74/0816; H04W 84/12
See application file for complete search history.

(56) References Cited

U.S. PATENT DOCUMENTS

2010/0074198 A1* 3/2010 Morioka .............. H04L 12/413 370/329
2010/0260159 A1* 10/2010 Zhang .................. H04W 28/06 370/338

(Continued)

FOREIGN PATENT DOCUMENTS

KR 10-2009-0031434 A 3/2009
KR 10-2010-0067894 A 6/2010
KR 10-2010-0130535 A 12/2010
WO 2011-087578 A2 7/2011

*Primary Examiner* — John Pezzlo
*Assistant Examiner* — Dharmesh Patel
(74) *Attorney, Agent, or Firm* — Dentons US LLP

(57) ABSTRACT

The present invention relates to a method for performing channel sounding by means of an access point (AP) in a wireless LAN system. The method includes the steps of transmitting a null data packet announcement (NDPA) frame to notify that an NDP is to be transmitted, transmitting the NDP, and receiving a feedback frame from a station (STA). The NDP includes a signal field. The signal field of the NDP is transmitted through two orthogonal frequency division multiplexing (OFDM) symbols. One of the two OFDM symbols is a repeated OFDM symbol signifying that the other is repeated.

12 Claims, 13 Drawing Sheets

STAa (30)
AP (10)
STA 1 (21)
STA 2 (22)
STA 3 (23)
STA 4 (24)

(51) Int. Cl.
*H04L 5/00* (2006.01)
*H04W 84/12* (2009.01)
*H04W 88/08* (2009.01)
*H04L 27/20* (2006.01)

(52) U.S. Cl.
CPC ......... *H04L25/0226* (2013.01); *H04L 27/261* (2013.01); *H04L 27/2032* (2013.01); *H04W 84/12* (2013.01); *H04W 88/08* (2013.01)

(56) References Cited

U.S. PATENT DOCUMENTS

2010/0271992 A1 10/2010 Wentink et al.
2011/0026623 A1* 2/2011 Srinivasa .............. H04L 1/0016 375/260
2011/0280232 A1* 11/2011 Wu ....................... H04W 28/06 370/338
2011/0299468 A1* 12/2011 Van Nee ............. H04L 27/2613 370/328

* cited by examiner

AP
(10)
STAa
(30)
STA 1
(21)
STA 2
(22)
STA 3
(23)
STA 4
(24)

Format of Data field
(non LDPC case only)
SERVICE
16 bits
Scrambled
PSDU
6·N_ES
Tail bits
Pad
bits
310
(a)
8μs
8μs
4μs
L-STF
(311)
L-LTF
(312)
L-
SIG
(313)
DATA
(314)
320
(b)
8μs
8μs
4μs
8μs
4μs
L-STF
(321)
L-LTF
(322)
L-
SIG
(323)
HT-SIG
(324)
HT-
STF
(325)
Data HT-LTFs
4μs per LTF
Extension HT-LTFs
4μs per LTF
HT-
LTF
...
HT-
LTF
HT-
LTF
...
HT-
LTF
(326)
DATA
(327)
330
(c)
8μs
8μs
8μs
HT-GF-STF
(331)
HT-LTF1
(332)
HT-SIG
(333)
Data HT-LTFs
4μs per LTF
Extension HT-LTFs
4μs per LTF
HT-
LTF2
...
HT-
LTF2
HT-
LTF2
...
HT-
LTF2
(334)
DATA
(335)

(A)
1100a
(In the case of MIMO)
STF (2symbols)
LTF1 (2symbols)
SIG (2symbols)
LTF2
LTF N
1110a
1120a
1130a
1140a
SIG
SIG repetition
QBPSK modulation
QBPSK
Q
I
1
0
+1
-1
(B)
1100b
(In the case of MIMO)
STF (repetition) (4symbols)
LTF1 (repetition) (4symbols)
SIG (repetition) (4or6symbols)
LTF2
LTF N
DATA (repetition or non-repetition)
1110b
1120b
1130b
1140b
1150b
SIG1
SIG1 repetition
SIG2
SIG2 repetition
SIG3
SIG3 repetition
BPSK modulation
BPSK
Q
I
1
0
+1
-1

METHOD FOR PERFORMING CHANNEL SOUNDING IN WIRELESS LAN SYSTEM AND APPARATUS

This application is a National Stage entry of International Application No. PCT/KR2012/010507 filed Dec. 6, 2012, which claims priority to U.S. Provisional Application No. 61/567,600 filed Dec. 6, 2011, both of which are incorporated herein by reference.

BACKGROUND OF THE INVENTION

1. Field of the Invention

The present invention relates to wireless communication and, more particularly, to a method of performing channel sounding in a wireless local area network system and an apparatus supporting the same.

2. Related Art

With the recent development of information communication technology, a variety of wireless communication techniques are being developed. From among them, a Wireless Local Area Network (WLAN) is a technique for wirelessly accessing the Internet at homes or companies or in specific service providing areas by using portable terminals, such as a Personal Digital Assistant (PDA), a laptop computer, and a Portable Multimedia Player (PMP), based on wireless frequency technology.

In existing WLAN systems supporting High Throughput (HT) and Very High Throughput (VHT), a WLAN system that may operate in a band of 1 GHz or less is being proposed unlike in systems using 20/40/80/160/80+80 MHz bandwidths of a 2 GHz band and/or a 5 GHz band. If a WLAN system operates in a band of 1 GHz or less, a channel having a very narrow bandwidth is used compared to existing WLAN systems. Accordingly, service coverage can be further extended compared to the existing systems.

Meanwhile, if a frequency band, that is, a basis for the operation of a WLAN system, is changed, the format of physical layer data unit suitable for the characteristics of a changed physical layer needs to be proposed. It is also required to propose a channel sounding method capable of providing support so that channel state information in a changed channel band is fed back.

SUMMARY OF THE INVENTION

The present invention provides a channel sounding method in a wireless local area network system and an apparatus supporting the same.

In an aspect, a method of performing a channel sounding in a wireless local area network system is provided. The method performed by an access point (AP) includes sending a Null Data Packet Announcement (NDPA) frame announcing that an NDP is to be transmitted, sending the NDP, and receiving a feedback frame from a station (STA). The NDP includes a signal field. The signal field of the NDP is transmitted through two Orthogonal Frequency Division Multiplexing (OFDM) symbols. One of the two OFDM symbols is a repetition OFDM symbol of a remaining one OFDM symbol.

A modulation scheme that makes constellation mapping subject to 90-degree phase rotation compared to constellation mapping of a modulation scheme that is applied to OFDM symbols for a signal field included in a data unit transmitted by the AP may be applied to the two OFDM symbols for the signal field.

A Quadrature Binary Phase Shift Keying (QBPSK) may be applied to the two OFDM symbols for the signal field of the NDP as the modulation scheme, and a Binary Phase Shift Keying (BPSK) may be applied to the OFDM symbols for the signal field of the data unit as the modulation scheme.

A Binary Phase Shift Keying (BPSK) may be applied to the two OFDM symbols for the signal field of the NDP as the modulation scheme, and a Quadrature Binary Phase Shift Keying (QBPSK) may be applied to the OFDM symbols for the signal field of the data unit as the modulation scheme.

The signal field may include a subfield of a number of spatial streams that indicates whether or not at least one Long Training Field (LTF) for Multiple Input Multiple Output (MIMO) channel estimation has been included.

When the subfield of the number of spatial streams is indicative of a number of a plurality of spatial streams, the NDP may further include at least one LTF.

The NDPA frame, the NDP and the feedback frame may be transmitted through a 1 MHz channel of a band of 1 GHz or less.

In another aspect, a wireless apparatus for operating in a wireless local area network system is provided. The wireless device includes a transceiver configured to transmit and receive radio signals, and a processor functionally connects with the transceiver and configured to send a Null Data Packet Announcement (NDPA) frame announcing that an NDP is to be transmitted, send the NDP, and receive a feedback frame from a station (STA). The NDP includes a signal field. The signal field of the NDP is transmitted through two Orthogonal Frequency Division Multiplexing (OFDM) symbols. One of the two OFDM symbols is a repetition OFDM symbol of a remaining one OFDM symbol.

An Access Point (AP) may provide a Null Data Packet (NDP) having a format suitable for channel sounding for 1 MHz transmission. Accordingly, a station (STA) receiving the NDP may automatically detect that a data unit transmitted through a modulation scheme to which an Orthogonal Frequency Division Multiplexing symbol (OFDM) for the signal field for the NDP has been applied is the NDP. Accordingly, there is an advantage in that overhead attributable to an NDP can be reduced and efficient channel sounding can be supported because OFDM symbols having a number smaller than the number of OFDM symbols for the signal field of a Physical Layer Convergence Procedure (PLCP) Protocol Data Unit (PPDU) for common data transmission is transmitted for the SIG field of the NDP.

DESCRIPTION OF EXEMPLARY EMBODIMENTS

Figure 1:
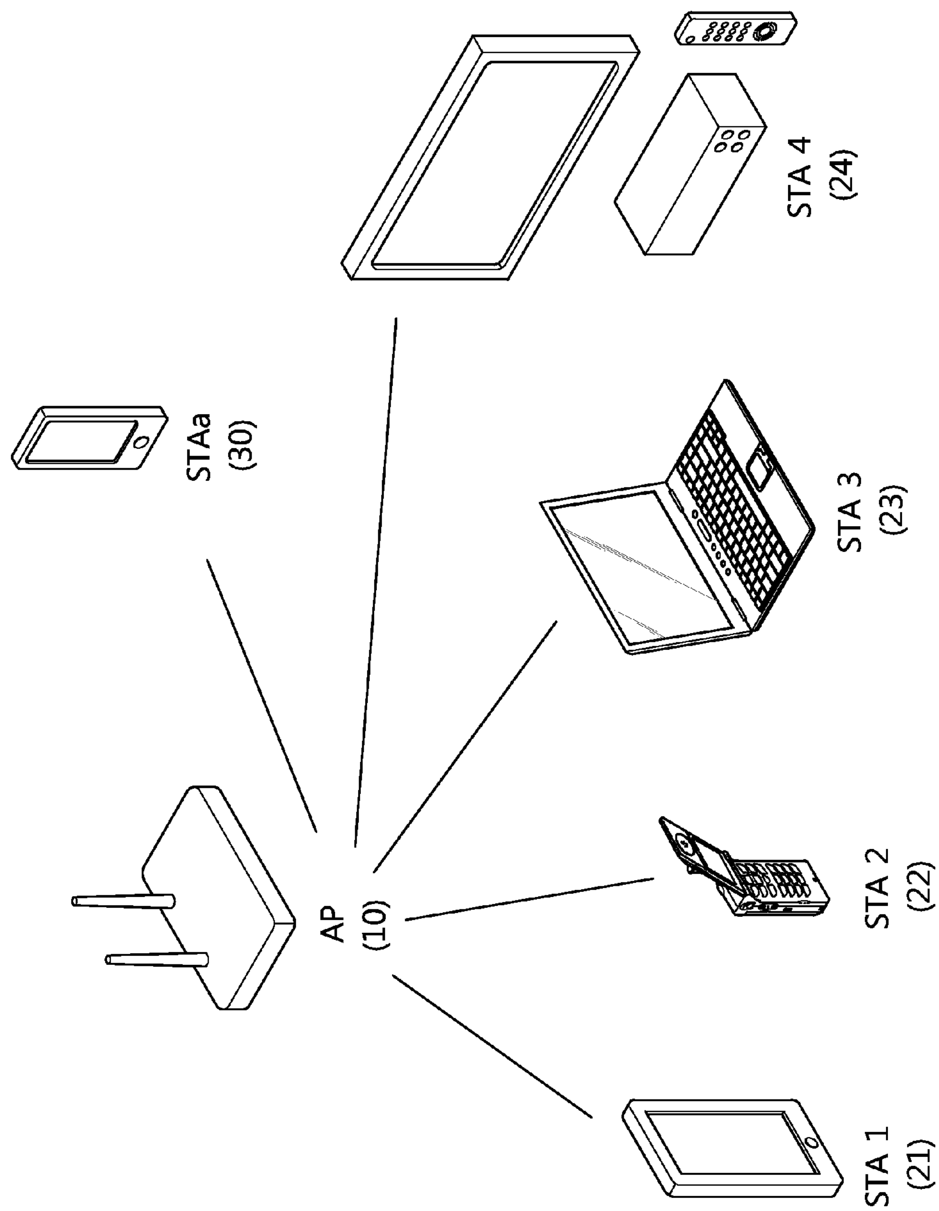
FIG. 1 is a diagram illustrating the configuration of a Wireless Local Area Network (WLAN) system to which an embodiment of the present invention may be applied.

FIG. 1 is a view illustrating the configuration of a general wireless LAN (Local Area Network) system to which an embodiment of the present invention may apply.

Referring to FIG. 1, the wireless LAN system includes one or more basic service sets (BSSs). A BSS is a set of stations (STAs) that may be successfully synchronized with each other and may communicate with each other, and is not a concept indicating a specific area.

An infrastructure BSS includes one or more non-AP stations (non-AP STA1 (21), non-AP STA2 (22), non-AP STA3 (23), non-AP STA4 (24), and non-AP STAa (30)), an AP (Access Point) 10 providing a distribution service, and a distribution system (DS) linking multiple APs. In the infrastructure BSS, the AP manages the non-AP STAs of the BSS.

In contrast, an independent BSS (IBSS) is a BSS operating in an ad-hoc mode. The IBSS does not include an AP and thus lacks a centralized management entity. That is, in the IBSS, non-AP STAs are managed in a distributed manner. In the IBSS, all the STAs may be mobile STAs, and due to no permission to access the DS, constitute a self-contained network.

The STA is any functional medium that includes a medium access control (MAC) that follows the IEEE (Institute of Electrical and Electronics Engineers) 802.11 standards and a physical layer interface of a radio medium and in broader concept includes an AP and a non-AP station.

The non-AP STA is an STA, but not an AP, and may also be referred to as a mobile terminal, wireless device, wireless transmit/receive unit (WTRU), user equipment (UE), mobile station (MS), mobile subscriber unit or simply user. Hereinafter, for ease of description, the non-AP STA is denoted STA.

The AP is a functional medium that provides access to a DS via a radio medium for an STA associated with an AP. In an infrastructure BSS including an AP, communication between STAs is in principle achieved via an AP, but in case a direct link is set up, the STAs may perform direct communication between each other. The AP may also be referred to as a central controller, base station (BS), node-B, BTS (Base Transceiver System), site controller, or managing STA.

A plurality of BSSs including the BSS shown in FIG. 1 may be connected to each other via a distribution system (DS). The plurality of BSSs linked with each other through a DS is referred to as an extended service set (ESS). The APs and/or STAs included in the ESS may communicate with each other, and in the same ESS, STAs may travel from one BSS to another BSS while maintaining seamless communication.

In the wireless LAN system according to IEEE 802.11, the basic access mechanism of MAC (Medium Access Control) is the CSMA/CS (Carrier Sense Multiple Access with Collision Avoidance) mechanism. The CSMA/CS mechanism is also referred to as distributed coordination function (DCF) of IEEE 802.11 MAC, and basically, it adopts a “listen before talk” access mechanism. Following such type of access mechanism, an AP and/or STA senses a radio channel or medium prior to transmission. If as a result of the sensing, the medium is determined to be in idle state, frame transmission is initiated through the medium. On the contrary, if the medium is sensed to be in occupied state, the AP and/or STA sets a deferred time for medium access and waits without starting its own transmission.

The CSMA/CS mechanism includes virtual carrier sensing in addition to physical carrier sensing in which an AP and/or STA directly senses a medium. The virtual carrier sensing is to make up for a problem that may occur in connection with medium access, such as hidden node problem. In order for virtual carrier sensing, the MAC of the wireless LAN system makes use of a network allocation vector (NAV). The NAV is a value by which an AP and/or STA currently using a medium or having authority to use the medium informs other AP and/or STA of a time remaining until the medium turns available. Accordingly, the value set by the NAV corresponds to a period during which the use of the medium is scheduled by the AP and/or STA transmitting a frame.

The IEEE 802.11 MAC protocol, together with a DCF, offers an HCF (Hybrid Coordination Function) that is based on a PCF (Point Coordination Function) that periodically performs polling so that all receiving APs and/or STAs may receive data packets in polling-based synchronized access scheme with the DCF. The HCF has HCCA (HCF Controlled Channel Access) that uses contention free-based channel access scheme using a polling mechanism and EDCA (Enhanced Distributed Channel Access) that has a contention-based access scheme for providing data packets to multiple users. The HCF includes a medium access mechanism for enhancing QoS (Quality of Service) of wireless LAN and may transmit QoS data in both a contention period (CP) and contention free period (CFP).

The wireless communication system cannot be immediately aware of the existence of a network due to the characteristics of the radio medium when an STA powers on and starts operating. Accordingly, in order to access a network, an STA, whatever type it is, should go through a network discovery process. When discovering a network through the network discovery process, the STA selects a network to subscribe to through a network selection process. Thereafter, the STA subscribes to the selected network and performs data exchange at a transmission end/reception end.

In the wireless LAN system, the network discovery process is implemented as a scanning procedure. The scanning procedure is separated into passive scanning and active scanning. The passive scanning is achieved based on a beacon frame that is periodically broadcast by an AP. In general, an AP in the wireless LAN system broadcasts a beacon frame at a specific interval (for example, 100 msec).

The beacon frame includes information on a BSS managed by it. The STA passively awaits reception of the beacon frame at a specific channel. When obtaining the information on the network by receiving the beacon frame, the STA terminates the scanning procedure at the specific channel. The STA need not transmit a separate frame in achieving passive scanning, and the passive scanning is rather done once the beacon frame is received. Accordingly, the passive scanning may reduce the overall overhead. However, it suffers from a scanning time that is increased in proportion to the transmission period of the beacon frame.

The active scanning is that the STA actively broadcasts a probe request frame at a specific channel to request that all the APs to receive the probe request frame send network information to the STA. When receiving the probe request frame, an AP waits for a random time so as to prevent frame collision, and then includes network information in a probe response frame, then transmits the probe response frame to the STA. The STA receives the probe response frame to thereby obtain the network information, and the scanning procedure is then ended. The active scanning may get scanning done relatively quickly, but may increase the overall network overhead due to the need of a frame sequence that comes from request-response.

When finishing the scanning procedure, the STA selects a network per a specific standard on itself and then performs an authentication procedure alongside the AP. The authentication procedure is achieved in 2-way handshake. When completing the authentication procedure, the STA proceeds with an association procedure together with the AP.

The association procedure is performed in two-way handshake. First, the STA sends an association request frame to the AP. The association request frame includes information on the STA's capabilities. Based on the information, the AP determines whether to allow association with the STA. When determining whether to allow association, the AP transmits an association response frame to the STA. The association response frame includes information indicating whether to allow association and information indicating the reason for association being allowed or failing. The association response frame further includes information on capabilities supportable by the AP. In case association is successfully done, normal frame exchange is done between the AP and STA. In case association fails, the association procedure is retried based on the information on the reason for the failure included in the association response frame or the STA may send a request for association to other AP.

In order to overcome limit to speed that is considered to be a weakness in wireless LAN, IEEE 802.11n has been established relatively in recent years. IEEE 802.11n aims to increase network speed and reliability while expanding wireless network coverage. More specifically, IEEE 802.11n supports high throughput (HT) that reaches data processing speed up to 540 Mbps and is based on MIMO (Multiple Inputs and Multiple Outputs) technology that adopts multiple antennas at both transmission end and reception end in order to optimize data speed and minimize transmission errors.

As wireless LAN spreads and more diversified applications using wireless LAN show up, a need for a new wireless LAN system arises for supporting a higher throughput than the data processing speed supported by IEEE 802.11n. The wireless LAN system supporting very high throughput (VHT) is a subsequent version of the IEEE 802.11n wireless LAN system, which is a new one recently suggested to support a throughput more than 500 Mbps for a single user and data processing speed more than 1 Gpbs for multiple users in an MAC service access point (SAP).

Advancing further than the existing wireless LAN system supporting 20 MHz or 40 MHz, the VHT wireless LAN system intends to support 80 MHz, contiguous 160 MHz, non-contiguous 160 MHz band transmission and/or more bandwidth transmission. Further, the VHT wireless LAN system supports 250QAM that is more than a maximum of 64QAM (Quadrature Amplitude Modulation) of the existing wireless LAN system.

Since the VHT wireless LAN system supports an MU-MIMO (Multi User-Multiple Input Multiple Output) transmission method for higher throughput, the AP may transmit a data frame simultaneously to at least one or more MIMO-paired STAs. The number of paired STAs may be maximally 4, and when the maximum number of spatial streams is eight, each STA may be assigned up to four spatial streams.

Referring back to FIG. 1, in the wireless LAN system shown in the figure, the AP 10 may simultaneously transmit data to an STA group including at least one or more STAs among a plurality of STAs 21, 22, 23, 24, and 30 associated with the AP 10. In FIG. 1, by way of example, the AP conducts MU-MIMO transmission to the STAs. However, in a wireless LAN system supporting TDLS (Tunneled Direct Link Setup) or DLS (Direct Link Setup) or mesh network, an STA to transmit data may send a PPDU to a plurality of STAs using an MU-MIMO transmission scheme. Hereinafter, an example where an AP transmits a PPDU to a plurality of STAs according to an MU-MIMO transmission scheme is described.

Data may be transmitted through different spatial streams to each STA. The data packet transmitted by the AP 10 may be referred to as a PPDU, which is generated at the physical layer of the wireless LAN system and transmitted, or a frame as a data field included in the PPDU. That is, the PPDU for SU (single user)-MIMO and/or MU-MIMO or data field included in the PPDU may be called a MIMO packet. Among them, the PPDU for MUs may be called an MU packet. In the example of the present invention, assume that a transmission target STA group MU-MIMO-paired with the AP 10 includes STA1 21, STA2 22, STA3 23, and STA4 24. At this time, no spatial stream is assigned to a specific STA in the transmission target STA group, so that no data may be transmitted to the specific STA. Meanwhile, assume that STAa 30 is associated with the AP but is not included in the transmission target STA group.

In the wireless LAN system, an identifier may be assigned to the transmission target STA group in order to support MU-MIMO transmission, and this identifier is denoted group ID. The AP sends a group ID management frame including group definition information for allocating group IDs to the STAs supporting MU-MIMO transmission and accordingly the group IDs are assigned to the STAs before PPDU transmission. One STA may be assigned a plurality of group IDs.

Table 1 below represents information elements included in the group ID management frame.

TABLE 1

| order | information |
|---|---|
| 1 | category |
| 2 | VHT action |
| 3 | Membership status |
| 4 | Spatial stream position |

The category field and VHT action field are configured so that the frame corresponds to a management frame and to be able to identify being a group ID management frame used in a next-generation wireless LAN system supporting MU-MIMO.

As in Table 1, the group definition information includes membership status information indicating whether to belong to a specific group ID, and in case of belonging to the group ID, information indicating the number of position to which the spatial stream set of the STA corresponds in all the spatial streams according to MU-MIMO transmission.

Since one AP manages a plurality of group IDs, the membership status information provided to one STA needs to indicate whether the STA belongs to each of the group IDs managed by the AP. Accordingly, the membership status information may be provided in the form of an array of subfields indicating whether it belongs to each group ID. The spatial stream position information indicates the position of each group ID, and thus, may be provided in the form of an array of subfields indicating the position of a spatial stream set occupied by the STA with respect to each group ID. Further, the membership status information and spatial stream position information for one group ID may be implemented in one subfield.

The AP, in case of sending a PPDU to a plurality of STAs through an MU-MIMO transmission scheme, transmits the PPDU, with information indicating a group identifier (group ID) in the PPDU as control information. When receiving the PPDU, an STA verifies whether it is a member STA of the transmission target STA group by checking the group ID field. If the STA is a member of the transmission target STA group, the STA may identify what number of position where the spatial stream set transmitted to the STA is located in the entire spatial stream. The PPDU includes information on the number of spatial streams allocated to the receiving STA, and thus, the STA may receive data by discovering the spatial streams assigned thereto.

Meanwhile, TV WS (White Space) draws attention as a newly available frequency band in the wireless LAN system. TV WS refers to an unused frequency band that is left as the analog TV broadcast is digitalized in the U.S. For example, TV WS includes a 54 to 598 MHz band. However, this is merely an example, and TV WS may be a permitted band that may be first used by a licensed user. The licensed user means a user that is permitted for use of a permitted band, and may also be referred to as a licensed device, primary user, or incumbent user.

The AP and/or STA operating in the TV WS should offer a protection function as to a licensed user, and this is because a licensed user has priority as to use of a TV WS band. For instance, in case a licensed user such as a microphone is already using a specific WS channel that is a frequency band split per protocol to have a certain bandwidth in the TV WS band, the AP and/or STA cannot use the frequency band corresponding to the WS channel in order to protect the licensed user. Further, the AP and/or STA should stop use of the frequency band if the licensed user happens to use the frequency band that is being used for transmission and/or reception of a current frame.

Accordingly, the AP and/or STA should first grasp whether a specific frequency band in the TV WS band is available, in other words, whether there is a licensed user in the frequency band. Grasping whether there is a licensed user in the specific frequency band is denoted spectrum sensing. As a spectrum sensing mechanism, an energy detection scheme or signature detection scheme may be utilized. If the strength of a received signal is higher than a predetermined value, it is determined that it is being used by a licensed user, or if a DTV preamble is detected, it may be determined to be being used by a licensed user.

Figure 2:
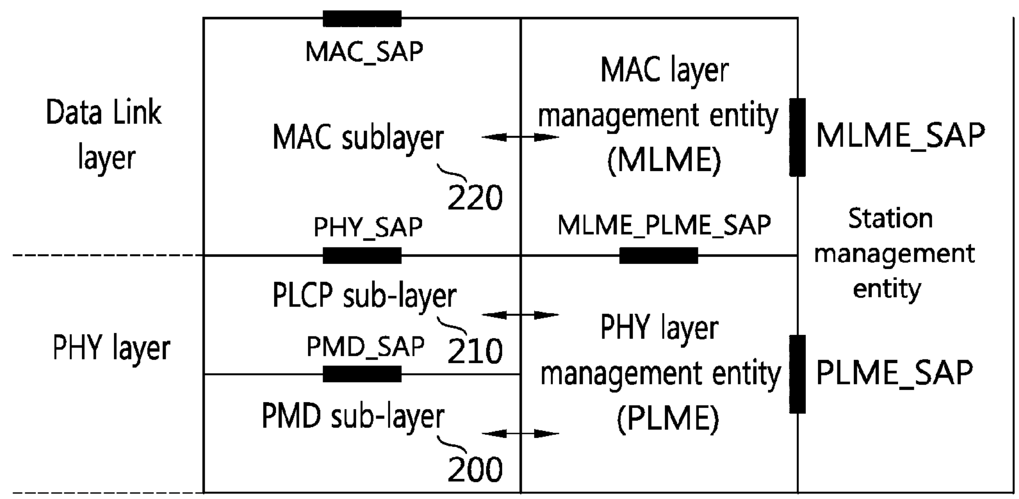
FIG. 2 is a diagram illustrating the architecture of a physical layer of a WLAN system supported by IEEE 802.11.

FIG. 2 is a view illustrating a physical layer architecture of a wireless LAN system supported by IEEE 802.11.

The IEEE 802.11 physical (PHY) architecture includes a PLME (PHY Layer Management Entity), a PLCP (Physical Layer Convergence Procedure) sublayer 210, and a PMD (Physical Medium Dependent) sublayer 200. The PLME provides a function of managing the physical layer in cooperation with the MLME (MAC Layer Management Entity). The PLCP sublayer 210 delivers an MPDU (MAC Protocol Data Unit) received from the MAC sublayer 220 to the PMD sublayer in response to an instruction of the MAC layer between the MAC sublayer 220 and the PMD sublayer 200 or delivers a frame coming from the PMD sublayer 200 to the MAC sublayer 220. The PMD sublayer 200 is a PLCP lower layer and enables transmission and reception of a physical layer entity between two stations through a radio medium. The MPDU delivered by the MAC sublayer 220 is denoted a PSDU (Physical Service Data Unit) in the PLCP sublayer 210. The MPDU is similar to the PSDU, but in case an A-MPDU (aggregated MPDU) obtained by aggregating a plurality of MPDUs is delivered, each MPDU may be different from each PSDU.

The PLCP sublayer 210 adds an additional field including information needed by a physical layer transceiver while delivering a PSDU from the MAC sublayer 220 to the PMD sublayer 200. At the time, the added field may include a PLCP preamble to the PSDU, a PLCP header, or tail bits necessary for turning a convolution encoder back into the zero state. The PLCP sublayer 210 receives from the MAC sublayer a TXVECTOR parameter including control information necessary to generate and transmit a PPDU and control information necessary for the STA to receive and analyze a PPDU. The PLCP sublayer 210 uses information included in the TXVECTOR parameter in generating a PPDU including the PSDU.

The PLCP preamble plays a role to let the receiver prepare for a synchronization function and antenna diversity before the PSDU is transmitted. The data field may include padding bits to the PSDU, a service field including a bit sequence for initializing a scrambler, and a coded sequence where the tail bits-added bit sequence is encoded. At the time, as an encoding scheme, depending on the encoding scheme supported by the STA receiving the PPDU, BCC (Binary Convolution Coding) encoding or LDPC (Low Density Parity Check) encoding may be selected. The PLCP header includes a field including information on the PPDU (PLCP Protocol Data Unit) to be transmitted, and this will be described in further detail below with reference to FIGS. 3 and 4.

Figure 3:
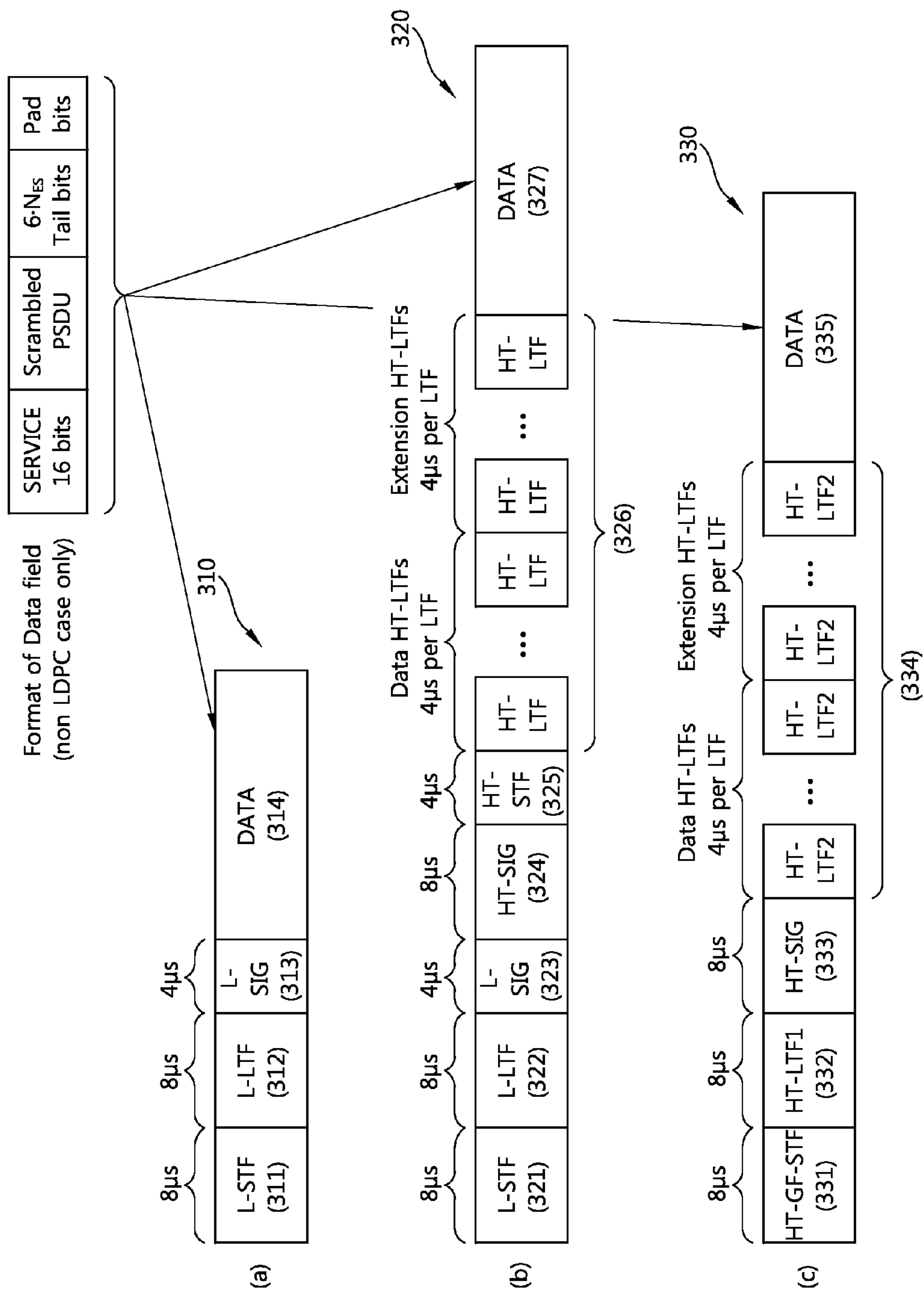
FIGS. 3 and 4 are block diagrams illustrating the format of a PPDU used in a WLAN system to which an embodiment of the present invention may be applied.
Figure 4:
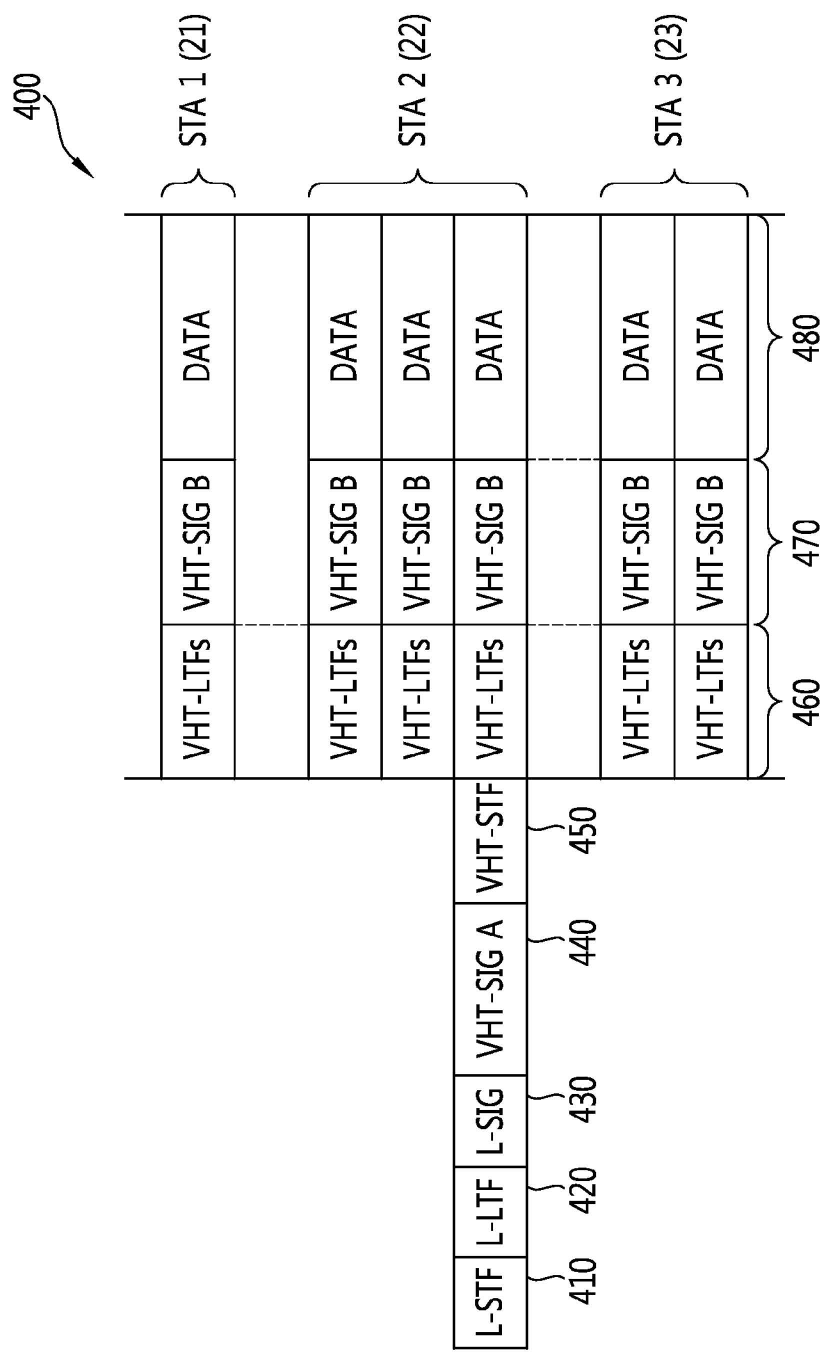

The PLCP sublayer 210 adds the above-described fields to the PSDU to thereby generate a PPDU (PLCP Protocol Data Unit) and transmits the PPDU to a receiving station via the PMD sublayer, and the receiving STA receives the PPDU and obtains the information necessary for restoring data from the PLCP preamble and PLCP header and restores data. The PLCP sublayer of the receiving station delivers to the MAC sublayer the RXVECTOR parameter including the control information contained in the PLCP header and the PLCP preamble and may analyze the PPDU and obtain data in the receiving state FIGS. 3 and 4 are block diagrams illustrating the format of a PPDU used in a wireless LAN system to which an embodiment of the present invention may apply. Hereinafter, the STA operating in a legacy wireless LAN system based on IEEE 802.11a/b/g, existing wireless LAN standards prior to IEEE 802.11n is referred to a legacy STA (L-STA). Further, the STA that may support HT in an HT wireless LAN system based on IEEE 802.11n is referred to as an HT-STA.

Subfigure (a) of FIG. 3 illustrates the format of a legacy PPDU (L-PPDU) used in IEEE 802.11a/b/g that are existing wireless LAN system standards before IEEE 802.11n. Accordingly, in the HT wireless LAN system to which the IEEE 802.11n standard applies, the legacy-STA (L-STA) may transmit and receive an L-PPDU having the same format.

The L-PPDU 310 includes an L-STF 311, an L-LTF 312, an L-SIG field 313, and a data field 314.

The L-STF 311 is used for frame timing acquisition, AGC (Automatic Gain Control) convergence, and coarse frequency acquisition.

The L-LTF 312 is used for frequency offset and channel estimation.

The L-SIG field 313 includes control information for demodulating and decoding the data field 314.

In the L-PPDU, the L-STF 311, the L-LTF 312, the L-SIG field 313, and the data field 314 may be transmitted in the order thereof.

Subfigure (b) of FIG. 3 is a block diagram illustrating an HT-mixed PPDU format that enables an L-STA and an HT-STA to co-exist. The HT-mixed PPDU 320 includes an L-STF 321, an L-LTF 322, an L-SIG 3 field 23, an HT-SIG field 324, an HT-STF 325, and a plurality of HT-LTFs 326, and a data field 327.

The L-STF 321, L-LTF 322, and L-SIG field 323 are the same as those denoted by reference numerals 311, 312, and 313, respectively. Accordingly, the L-STA, even when receiving the HT-mixed PPDU 320, may analyze the data field through the L-STF 321, L-LTF 322, and L-SIG 323. However, the L-SIG 323 may further include information for channel estimation that is to be conducted for the HT-STA to receive the HT-mixed PPDU 320 and to decipher the L-SIG 323, HT-SIG 324, and HT-STF 325.

The HT-STA may be aware that the HT-mixed PPDU 320 is a PPDU for itself through the HT-SIG 324 coming after the L-SIG 323, and based on this, may demodulate and decode the data field 327.

The HT-STF 325 may be used for frame timing synchronization or AGC convergence for an HT-STA.

The HT-LTF 326 may be used for channel estimation to demodulate the data field 327. Since IEEE 802.11n supports SU-MIMO, there may be a plurality of HT-LTFs 326 for each data field transmitted in a plurality of spatial streams.

The HT-LTF 326 may consist of a data HT-LTF used for channel estimation for a spatial stream and an extension HT-LTF additionally used for full channel sounding. Accordingly, the number of the plurality of HT-LTFs 326 may be equal to or more than the number of spatial streams transmitted.

In the HT-mixed PPDU 320, the L-STF 321, L-LTF 322, and the L-SIG field 323 are first transmitted so that the L-STA may also receive it to thereby obtain data. Thereafter, the HT-SIG field 324 is transmitted for demodulating and decoding data transmitted for the HT-STA.

The HT-SIG field 324 and its precedents are transmitted without beamforming, so that the L-STA and the HT-STA may receive the PPDU to thereby obtain data, and the HT-STF 325, HT-LTF 326 and the data field 327 transmitted thereafter are subjected to radio signal transmission through precoding. Here, the HT-STF 325 is transmitted and then the plurality of HT-LTFs 326 and the data field 327 are transmitted so that a power variation by precoding may be taken into account by the STA conducting reception through precoding.

Although in the HT wireless LAN system, the HT-STA using 20 MHz uses 52 data subcarriers per OFDM symbol, the L-STA using the same frequency, 20 MHz, still makes use of 48 subcarriers per OFDM symbol. In order for backward compatibility with the existing systems, the HT-SIG field 324 in the HT-mixed PPDU 320 is decoded using the L-LTF 322, so that the HT-SIG field 324 is constituted of 48×2 data subcarriers. Thereafter, the HT-STF 325 and the HT-LTF 326 consists of 52 data subcarriers per OFDM symbol. As a result, the HT-SIG field 324 is supported with ½, BPSK (Binary Phase Shift Keying), each HT-SIG field 324 consists of 24 bits, and is thus transmitted with a total of 48 bits. In other words, channel estimation for the L-SIG field 323 and the HT-SIG field 324 utilizes the L-LTF 322, and the bit stream constituting the L-LTF 322 is represented as in Equation 1 below. The L-LTF 322 consists of 48 data subcarriers except a DC subcarrier per symbol.

$$L_{-26,26}\{1,1,-1,-1,1,1,-1,1,-1,1,1,1,1,1,1,-1,-1,1,1,-1,1,-1,1,1,1,1,0,1,-1,-1,1,1,-1,1,-1,1,-1,-1,-1,-1,-1,1,1,-1,-1,1,-1,1,-1,1,1,1,1\} \quad \text{[Equation 1]}$$

Subfigure (c) of FIG. 3 is a block diagram illustrating an HT-greenfield PPDU 330 format that may be used only by an HT-STA. The HT-GF PPDU 330 includes an HT-GF-STF 331, an HT-LTF1 332, an HT-SIG 333, a plurality of HT-LTF2's 334, and a data field 335.

The HT-GF-STF 331 is used for frame timing acquisition and AGC.

The HT-LTF1 332 is used for channel estimation.

The HT-SIG 333 is used for demodulating and decoding the data field 335.

The HT-LTF2 334 is used for channel estimation for demodulating the data field 335. Likewise, the HT-STA uses SU-MIMO and thus requires channel estimation for each data field transmitted I a plurality of spatial streams. Accordingly, a plurality of HT-LTFs 326 may be configured.

The plurality of HT-LTF2's 334 may consist of a plurality of extension HT-LTFs and a plurality of data HT-LTFs like the HT-LTFs 326 of the HT-mixed PPDU 320.

Each of the data fields 314, 327, and 335 may include a service field, a scrambled PSDU, a tail bit and a padding bit. The service field may be used for initializing a scrambler. The service field may be configured as 16 bits. In such case, seven bits may be configured for initializing a scrambler. The tail field may be configured as a bit sequence necessary for turning a convolution encoder back into a zero state. The tail field may be assigned a bit size that is proportional with the number of BCC (Binary Convolutional Code) encoders used for encoding data to be transmitted. More specifically, it may be configured to have six bits per BCC count.

FIG. 4 is a view illustrating an example of a PPDU format used in a wireless LAN system supporting VHT.

Referring to FIG. 4, the PPDU 400 may include an L-STF 410, an L-LTF 420, an L-SIG field 430, a VHT-SIGA field 440, a VHT-STF 450, a VHT-LTF 460, a VHT-SIGB field 470, and a data field 480.

The PLCP sublayer configuring the PHY adds necessary information to the PSDU delivered from the MAC layer to generate the data field 480, adds to it the L-STF 410, the L-LTF 420, the L-SIG field 430, the VHT-SIGA field 440, the VHT-STF 450, the VHT-LTF 460, and the VHT-SIGB field 470 or other fields to thereby generate the PPDU 400, and transmits it to one or more STAs through the PMD sublayer constituting the PHY. The control information necessary for the PLCP sublayer to generate the PPDU and the control information that is included in the PPDU and transmitted to be used for the receiving STA to interpret the PPDU are provided from the TXVECTOR parameter delivered from the MAC layer.

The L-STF 410 is used for frame timing acquisition, AGC (Automatic Gain Control) convergence, and coarse frequency acquisition.

The L-LTF 420 is used for channel estimation to demodulate the L-SIG field 430 and the VHT-SIGA field 440.

The L-SIG field 430 is used for the L-STA to receive the PPDU 400 and interpret the PPDU 400 to thereby obtain data. The L-SIG field 430 includes a rate subfield, a length subfield, a parity bit and a tail field. The rate subfield is set with a value indicating a bit rate for data to be currently transmitted.

The length subfield is set as a value indicating the octet length of the PSDU by which the MAC layer sends a request for transmission to the PHY layer. At the time, a parameter related to the information on the octet length of the PSDU, L-LENGTH parameter, is determined based on a transmission time-related parameter, TXTIME parameter. TXTIME indicates a transmission time determined for transmission of the PPDU including the PSDU by the PHY layer, corresponding to the transmission time requested by the MAC layer for transmission of the PSDU (physical service data unit). Accordingly, the L-LENGTH parameter is a time-related parameter, and thus, the length subfield included in the L-SIG field 430 ends up containing transmission time-related information.

The VHT-SIGA field 440 includes control information (or signal information) necessary for the STAs receiving the PPDU to interpret the PPDU 400. The VHT-SIGA field 440 is transmitted in two OFDM symbols. Accordingly, the VHT-SIGA field 440 may be split into a VHT-SIGA1 field and a VHT-SIGA2 field. The VHT-SIGA1 field includes information on the channel bandwidth used for PPDU transmission, identification information related to whether STBC (Space Time Block Coding) is to be used, information indicating one of the SU or MU-MIMO scheme in which the PPDU is transmitted, information indicating a transmission target STA group including a plurality of STAs MU-MIMO paired with the AP in case the transmission scheme is MU-MIMO, and information on a spatial stream assigned to each STA included in the transmission target STA group. The VHT-SIGA2 field includes short guard interval (GI)-related information.

The information indicating the MIMO transmission scheme and the information indicating the transmission target STA group may be implemented as one piece of MIMO indication information, and as an example, may be embodied as a group ID. The group ID may be set as a value having a specific range, and in the range, a predetermined value indicates the SU-MIMO transmission scheme, and the other values may be used as an identifier for the transmission target STA group in case the PPDU 400 is transmitted in the MU-MIMO transmission scheme.

If the group ID indicates that the PPDU 400 is transmitted through the SU-MIMO transmission scheme, the VHT-SIGA2 field includes coding indication information indicating whether the coding scheme applied to the data field is BCC (Binary Convolution Coding) or LDPC (Low Density Parity Check) coding and MCS (modulation coding scheme) information on a channel between transmitter and receiver. Further, the VHT-SIGA2 field may include a partial AID including the AID of the transmission target STA of the PPDU and/or some bit sequences of the AID.

If the group ID indicates that the PPDU 400 is transmitted through the MU-MIMO transmission scheme, the VHT-SIGA field 440 includes coding indicating information indicating whether the coding scheme applied to the data field intended to be sent to the receiving STAs MU-MIMO paired is BCC or LDPC coding. In such case, the MCS (modulation coding scheme) information on each receiving STA may be included in the VHT-SIGB field 470.

The VHT-STF 450 is used for enhancing the ACG estimation capabilities in MIMO transmission.

The VHT-LTF 460 is used for an STA to estimate an MIMO channel. Since the next-generation wireless LAN system supports MU-MIMO, as many VHT-LTFs 460 as the number of spatial streams where the PPDU 400 is transmitted may be configured. Additionally, full channel sounding is supported, and in case this is conducted, the number of VHT LTFs may increase.

The VHT-SIGB field 470 includes dedicated control information necessary for a plurality of MIMO paired STAs to receive the PPDU 400 to obtain data. Accordingly, only when the control information included in the PPDU 400 indicates that the currently received PPDU 400 is MU-MIMO transmitted, the STA may be designed to decode the VHT-SIGB field 470. On the contrary, in case the control information included in the VHT-SIGA field 440 indicates that the currently received PPDU 400 is one for a single STA (including SU-MIMO), the STA may be designed not to decode the VHT-SIGB field 470.

The VHT-SIGB field 470 may contain information on the MCS (modulation and coding scheme) for each STA and information on rate matching. Further, it may contain information indicating the PSDU length included in the data field for each STA. The information indicating the length of the PSDU is information indicating the length of the bit sequence of the PSDU and may perform such information on a per-octet basis. Meanwhile, in case the PPDU is SU-transmitted, the information on the MCS is included in the VHT-SIGA field 440, so that it might not be included in the VHT-SIGB field 470. The size of the VHT-SIGB field 470 may vary depending on the type of the MIMO transmission (MU-MIMO or SU-MIMO) and channel bandwidth used for transmission of the PPDU.

The data field 480 includes data which intends to be sent to the STA. The data field 480 includes a service field for initializing a scrambler and PSDU (PLCP Service Data Unit) where an MPDU (MAC Protocol Data Unit) is delivered in the MAC layer, a tail field including a bit sequence necessary to turn the convolution encoder back into zero state, and padding bits for normalizing the length of the data field. In the case of MU transmission, the data field 480 transmitted to each STA may include a data unit whose transmission is intended, and the data unit may be an A-MPDU (aggregate MPDU).

A PHY layer can process fields in each PPDU format illustrated by FIGS. 3 and 4 and then can send the fields as OFDM symbol(s). A data sequence that is included in a data field can be transmitted as one or more data OFDM symbols. The generation/transmission/reception of the data OFDM symbols can be interfered due to a channel state, a mismatch of time synchronization between a transmitter and a receiver, an inert-symbol interference. To guarantee high reliability of a data unit transmission/reception and prevent abnormal operation, a guard interval (GI) can be applied to the data OFDM symbols. In HT WLAN system and VHT WLAN system, SGI (short guard interval) can be applied in order to reduce a length of the GI. In HT WLAN system and VHT WLAN system, a signal field and a VHT-SIG A field can indicate whether the SGI is applied.

In the wireless LAN system as shown in FIG. 1, in case the AP 10 attempts to send data to STA1 21, STA2 22, and STA3 23, a PPDU may be transmitted to the STA group including STA1 21, STA2 22, STA3 223, and STA4 24. In such case, as shown in FIG. 4, no spatial stream may be assigned to STA4 24, and a specific number of spatial streams are assigned to each of the STA1 21, STA2 22, and STA3 23, and data may be transmitted accordingly. In the example as illustrated in FIG. 4, one spatial stream may be assigned to STA1 21, three to STA2 22, and two to STA3 23.

One of the significant characteristics of a VHT WLAN system is to support an MU-MIMO transmission scheme in which several spatial streams are transmitted to a plurality of the STAs using multiple antennas. This may improve the throughput of the entire system. In an environment in which a plurality of STAs is present, an AP that attempts to send data sends a PPDU through a beamforming procedure in order to send the data to a transmission target STA group. Accordingly, the AP and/or the STAs attempting to send PPDUs using the MU-MIMO transmission scheme need to perform channel sounding in order to obtain channel information because channel information for each of the transmission target STAs is required.

Channel sounding for MU-MIMO may be initiated by a transmitter that forms a beam and that attempts to send a PPDU. The transmitter may be expressed as a beamformer, and a receiver may be expressed as a beamformee. In a WLAN system supporting DL MU-MIMO, an AP has the status of a transmitter and a beamformer, and channel sounding is initiated by the AP. An STA has the status of a receiver and a beamformee, and the STA estimates a channel according to channel sounding initiated by an AP and reports the estimation results.

In a VHT WLAN system, channel sounding is performed based on a Null Data Packet (NDP). The NDP has the format of a PPDU from which a data field has been excluded. An STA performs channel estimation based on the NDP and feeds channel state information, that is, the results of the estimation, back to an AP. The NDP may also be expressed as a sounding frame. Channel sounding based on an NDP is described with reference to FIG. 5.

Figure 5:
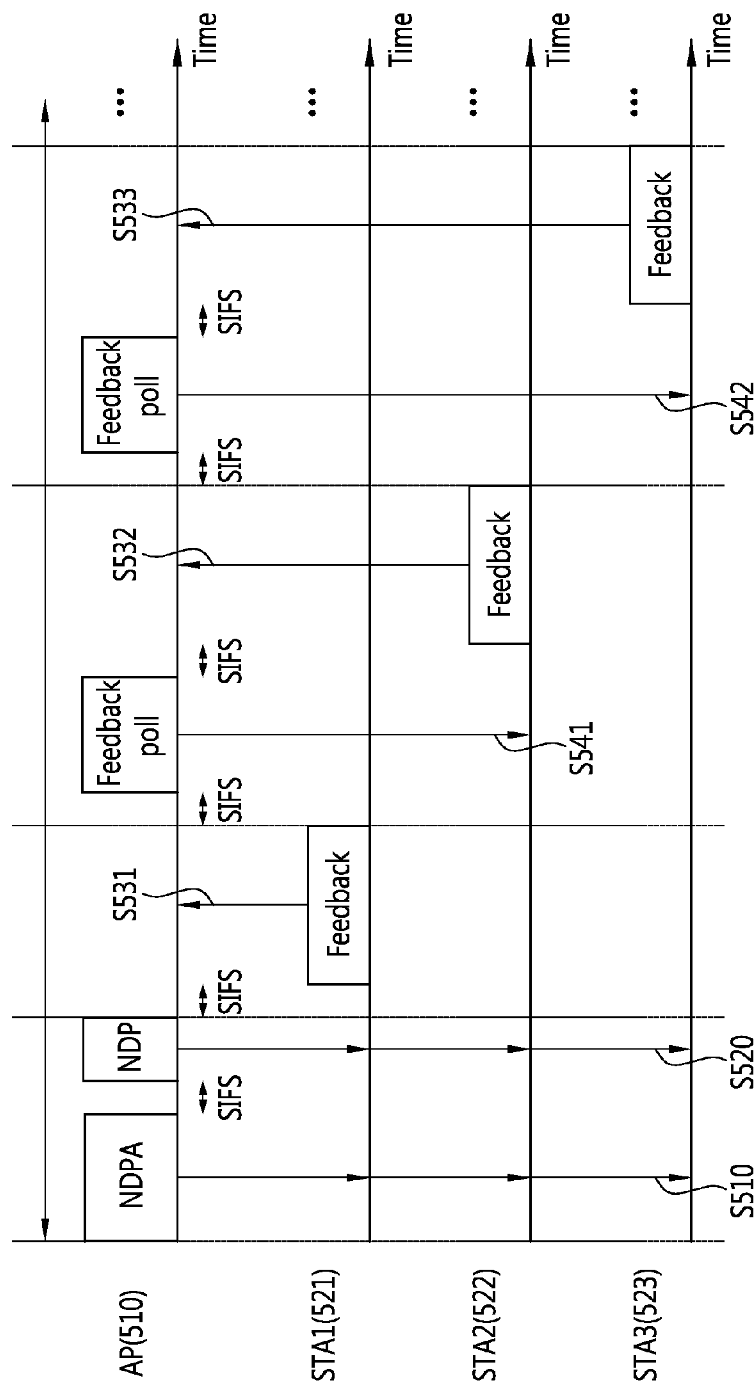
FIG. 5 is a diagram illustrating a channel sounding method using an NDP in a VHT WLAN system.

FIG. 5 is a diagram illustrating a channel sounding method using an NDP in a VHT WLAN system. In this example, an AP performs channel sounding on three transmission target STAs in order to send data to the three transmission target STAs. In this case, the AP may perform channel sounding on a single STA.

Referring to FIG. 5, the AP 510 sends an NDPA frame to the STA1 521, the STA2 522, and the STA3 523 (S410). The NDP announcement (NDPA) frame announces that channel sounding will be initiated and an NDP will be transmitted. The NDPA frame may also be called a sounding announcement frame.

The NDPA frame includes information for identifying an STA that will estimate a channel and that will send a feedback frame, including channel state information, to the AP. That is, the STA determines whether it is an STA participating in channel sounding by receiving the NDPA frame. Accordingly, the AP 510 includes an STA information field, including information about a sounding target STA, in the NDPA frame, and sends the NDPA frame. The STA information field may be included for each sounding target STA. If the NDPA frame is transmitted to one or more target STAs for MU-MIMO channel sounding, the AP 510 broadcasts the NDPA frame. In contrast, if the NDPA frame is transmitted to a single target STA for SU-MIMO channel sounding, the AP 510 may set information about the address of a receiver of the NDPA frame as the MAC address of the corresponding target STA, and may send the NDPA frame in a unicast way.

Table 2 below illustrates an example of the format of the STA information field included in the NDPA frame.

TABLE 2

| Subfield | Description |
|---|---|
| AID | Include AID of sounding target STA |
| Feedback type | Indicative of feedback request type of sounding target STA<br>In the case of SU-MIMO, '0'<br>In the case of MU-MIMO, '1' |
| Nc index | Indicative of requested feedback dimension<br>In the case of MU-MIMO:<br>When Nc = 1, set to '0'<br>When Nc = 2, set to '1'<br>When Nc = 3, set to '2'<br>When Nc = 4, set to '3'<br>When Nc = 5, set to '4'<br>When Nc = 6, set to '5'<br>When Nc = 7, set to '6'<br>When Nc = 8, set to '7'<br>In the case of SU-MIMO, reserved subfield (set to 0) |

In Table 2, Nc is indicative of the number of columns of beamforming feedback matrices belonging to pieces of feedback information that are transmitted from a sounding target STA that has received an NDP to an AP in response to the NDP.

The STAs that have received the NDPA frame may be aware of whether each of the STAs is a sounding target STA by checking an AID subfield value included in the STA information field. In an embodiment, such as FIG. 5, the NDPA frame may include an STA information field including the AID of the STA1 521, a STA information field including the AID of the STA2 522, and an STA information field including the AID of the STA3 523.

The AP 510 sends an NDP to the target STAs after the transmission of the NDPA frame (S520). The NDP may have a format in which a data field is not included in the format of a PPDU, such as FIG. 4. The NDP frame is precoded based on a specific precoding matrix by the AP 510, and is transmitted to the sounding target STAs. Accordingly, each of the sounding target STAs 521, 522, and 523 estimates a channel based on the VHT-LTF of the NDP, and obtains channel state information.

When sending the NDP, information indicative of the length of a PSDU included in the data field and the length of an Aggregate-MAC protocol data unit (A-MPDU) included in the PSDU, that is, control information included in the NDP, is set to 0, and information indicative of the number of transmission target STAs of the NDP is set to 1. A group ID indicative of whether a transmission scheme used to send the NDP is MU-MIMO or SU-MIMO and indicative of a transmission target STA group is set as a value indicative of SU-MIMO transmission. Information indicative of the number of spatial streams that are assigned to the transmission target STAs is set to be indicative of the number of spatial streams that are transmitted to the transmission target STAs through MU-MIMO or SU-MIMO. Channel bandwidth information used to send the NDP may be set as a bandwidth value used to send the NDPA frame.

The STA1 521 sends a feedback frame to the AP 510 (S531). Information about a channel bandwidth used to send the feedback frame may be set to be equal to or narrower than a channel bandwidth used to send the NDPA frame.

After receiving the feedback frame from the STA1 521, the AP 510 sends a feedback poll frame to the STA2 522 (S541). The feedback poll frame is a frame that requests a reception STA to send a feedback frame again. The feedback poll frame is transmitted to an STA that will be requested to send the feedback frame in a unicast way. The STA2 522 that has received the feedback poll frame sends a feedback frame to the AP 510 (S532). Next, the AP 510 sends a feedback poll frame to the STA3 523 (S542), and the STA3 523 sends a feedback frame to the AP 510 in response to the feedback poll frame (S533).

In a WLAN system, a channel bandwidth in which data is transmitted may be various. In order to estimate channels on various bandwidths, information about the channels of various bandwidths may be fed back. A VHT WLAN system supports bandwidths of 20 MHz, 40 MHz, 80 MHz, continuous 160 MHz, and noncontiguous 160 MHz. Accordingly, channel feedback information may be increased because information about the channel of each bandwidth is fed back.

In the present invention, channel state information according to channel estimation performed by the STA is included in the feedback frame transmitted from the STA to the AP, and is transmitted. The channel state information for the feedback frame may be implemented using a channel information field and a channel information control field. Table 3 and Table 4 below illustrate the formats of the channel information control field and the channel information field.

TABLE 3

| Subfield | Description |
|---|---|
| Nc index | Indicative of the number of columns of beamforming feedback matrices<br>When Nc = 1, 0<br>When Nc = 2, 1<br>. . .<br>When Nc = 8, 7 |
| Nr index | Indicative of the number of rows of beamforming feedback matrices<br>When Nr = 1, 0<br>When Nr = 2, 1<br>. . .<br>When Nr = 8, 7 |
| Channel bandwidth | Indicative of the bandwidth of an estimated channel<br>When 20 MHz, 0<br>When 40 MHz, 1<br>When 80 MHz, 2<br>When 160 MHz or 80 + 80 MHz, 3 |
| Grouping (Ng) | Indicative of subcarrier grouping used for beamforming feedback matrices<br>When Ng = 1, 0<br>When Ng = 2, 1<br>When Ng = 4, 2<br>(3 is set as reserved) |
| Codebook information | Indicative of the size of codebook entries |
| MU-method | Indicative of whether it is beamforming feedback for SU-MIMO or beamforming feedback for MU-MIMO |
| Sounding sequence | Sequence number from an NDPA that requests feedback |

TABLE 4

| Subfield | Description |
|---|---|
| Signal to noise ratio (SNR) of spatial stream1 | Average SNR on subcarriers in a receiver for the first spatial stream |
| . . . | . . . |
| SNR of spatial stream Nc | Average SNR on subcarriers in a receiver for an Nc-th spatial stream |
| Beamforming feedback matrix (subcarrier index 0) | Order of angles of a beamforming feedback matrix for a corresponding subcarrier |
| Beamforming feedback matrix (subcarrier index 1) | Order of angles of a beamforming feedback matrix for a corresponding subcarrier |
| . . . | . . . |
| Beamforming feedback matrix (subcarrier index Ns) | Order of angles of a beamforming feedback matrix for a corresponding subcarrier |

The pieces of the channel information field described in Table 4 may be interpreted based on the pieces of information included in the channel control field described in Table 3. For example, Ns is the number of subcarriers for a beamforming feedback matrix subfield that is returned and transmitted to a beamformer. A beamformee may control the value of the Ns through grouping. The value of Ns may vary depending on a channel bandwidth and the value Ng of a grouping subfield. Furthermore, the index of Ns subcarriers related to a beamforming feedback matrix is determined by the channel bandwidth and the value of the grouping subfield. Accordingly, the beamformer may be aware how Ns has been determined based on the channel bandwidth information and the grouping information of the channel information control field by receiving the feedback frame, and may also be aware of the index of subcarriers related to the beamforming feedback matrix.

Meanwhile, as various communication services, such as smart grid, e-Health, and ubiquitous, are recently emerging, Machine to Machine (M2M) technologies for supporting the various communication services have been in the spotlight. Each of sensors for sensing temperature and humidity, a camera, home appliances, such as TV, process machines in factories, and large-size machines, such as vehicles, may becomes one element that forms an M2M system. The elements that form the M2M system may send and receive data based on WLAN communication. If devices forming an M2M system support a WLAN and form a network, this is hereinafter called an M2M WLAN system.

The characteristics of a WLAN system that supports M2M are as follows.

1) A large number of STAs: In M2M, it is assumed that a large number of STAs are present within a BSS, unlike in an existing network. The reason for this is that not only devices owned by persons, but also sensors installed at homes and firms are taken into consideration. Accordingly, a good number of STAs may access a single AP.

2) A low traffic load per STA: An M2M terminal has a traffic pattern in which the M2M terminal collects and reports information nearby. Thus, collected information does not need to be frequently transmitted, and the amount of the information is small.

3) Uplink-centric communication: M2M is chiefly configured to receive an instruction in downlink, take action, and report resulting data in uplink. Since major data is commonly transmitted in uplink, uplink becomes the center in a system that supports M2M.

4) Management of power of an STA: An M2M terminal chiefly operates using a battery, and it is often difficult to frequently charge the battery. Accordingly, there is a need for a power management method for minimizing battery consumption.

5) Automatic recovery function: A device that forms an M2M system requires a self-recovery function because it is difficult for a person to directly manipulate the device in specific conditions.

The next-generation WLAN system in such M2M communication is a single usage example is being discussed. A significant characteristic of such a WLAN system is that it may have service coverage having a radius of 1 km or more in a non-licensed band of a 1 GHz band or less other than the TV WS band. This means that the WLAN system has very wide service coverage compared to an existing indoor-centric WLAN. That is, unlike in the existing 2.4 GHz and 5 GHz, if a WLAN operates in a band of 1 GHz or less represented as 700~900 MHz, the service coverage of an AP to the same transmission power may be extended about 2 to 3 times due to the propagation characteristics of a corresponding band. In such a case, a very large number of STAs can access a single AP. Usage examples taken into consideration in the next-generation WLAN may be as follows.

A usage example 1. Sensor and meters

1a: Smart grid—meter to pole

1c: Environmental/agricultural monitoring

1d: Industrial process sensors

1e: Healthcare

1f: Healthcare

1g: Home/building automation

1h: Home sensors

A usage example 2. Backhaul sensors and data meters

Backhaul aggregation of sensors

Backhaul aggregation of industrial sensors

A usage example 3. Extended range Wi-Fi

Outdoor extended range hotspot

Outdoor Wi-Fi for cellular traffic offloading

The case of sensors and meters, that is, the usage example 1, is a usage example regarding the aforementioned M2M. Various types of sensor devices may access an AP of a WLAN system, and may perform M2M communication. In particular, in the case of smart grid, 6000 sensor devices may access a single AP.

The case of backhaul sensors and data meters, that is, the usage example 2, is the case where an AP providing wide coverage functions as the backhaul link of another communication system.

The usage example 3 is the case where hotspot communication of an outdoor extended range, such as service coverage for extended homes, service coverage for campuses, and shopping malls, is a target to be provided and the case where an AP attempts to distribute heavy-loaded cellular traffic by offloading the traffic of cellular mobile communication.

The present invention proposes the format of a data unit for a device that operates in a band of 1 GHz or less as discussed in the next-generation WLAN standard. More specifically, the present invention proposes the structure of an effective physical layer preamble for a device that operates in a band of 1 GHz or less. Data units provided hereinafter, that is, PPDUs, may be sequentially transmitted in the form of an OFDM symbol in order that fields are included.

Communication in a band of 1 GHz or less has significant wide service coverage compared to an existing indoor-centric WLAN system in terms of its propagation characteristics. To this end, such communication may be implemented in such a manner that a physical layer (PHY) characteristic in an existing VHT WLAN system is 1/10 down-clocked. In such a case, the 20/40/80/160/80+80 MHz channel bandwidths in the VHT WLAN system are provided as 2/4/8/16/8+8 MHz channel bandwidths in a band of 1 GHz or less through such 1/10 down-clocking. Accordingly a Guard Interval (GI) is increased 10 times from existing 0.8 us to 8 us. Table 5 below illustrates a comparison between the performance of the physical layer of a VHT WLAN system and the performance of the physical layer of a WLAN system based on a 1/10 down-clocked band of 1 GHz or less.

TABLE 5

| VHT WLAN system PHY | | WLAN system PHY based on band of 1/10 down-clock in a band of 1 GHz or less | |
|---|---|---|---|
| Channel bandwidth | Throughput | Channel bandwidth | Throughput |
| 20 MHz | 86.7 Mbps | 2 MHz | 8.67 Mbps |
| 40 MHz | 200 Mbps | 4 MHz | 20 Mbps |
| 80 MHz | 433.3 Mbps | 8 MHz | 43.33 Mbps |
| 160 MHz | 866.7 Mbps | 16 MHz | 86.67 Mbps |
| 80 + 80 MHz | 866.6 Mbps | 8 + 8 MHz | 86.66 Mbps |

Hereinafter, assuming that the PHY characteristic of a VHT WLAN system has been 1/10 down-clocked for convenience of description, the case where single OFDM symbol duration is 40 us is described as an example. In the present invention, however, the scope of the present invention according to a proposed embodiment is not limited to a range of such a specific number.

A legacy device that is already taken into consideration in the prior art is not present in a band of 1 GHz or less. Thus, it may be important to design a PHY preamble so that it may be effectively applied to the band of 1 GHz or less without a need to take backward compatibility into consideration. When considering such a point, the format of a PPDU, such as FIG. 6, is proposed.

Figure 6:
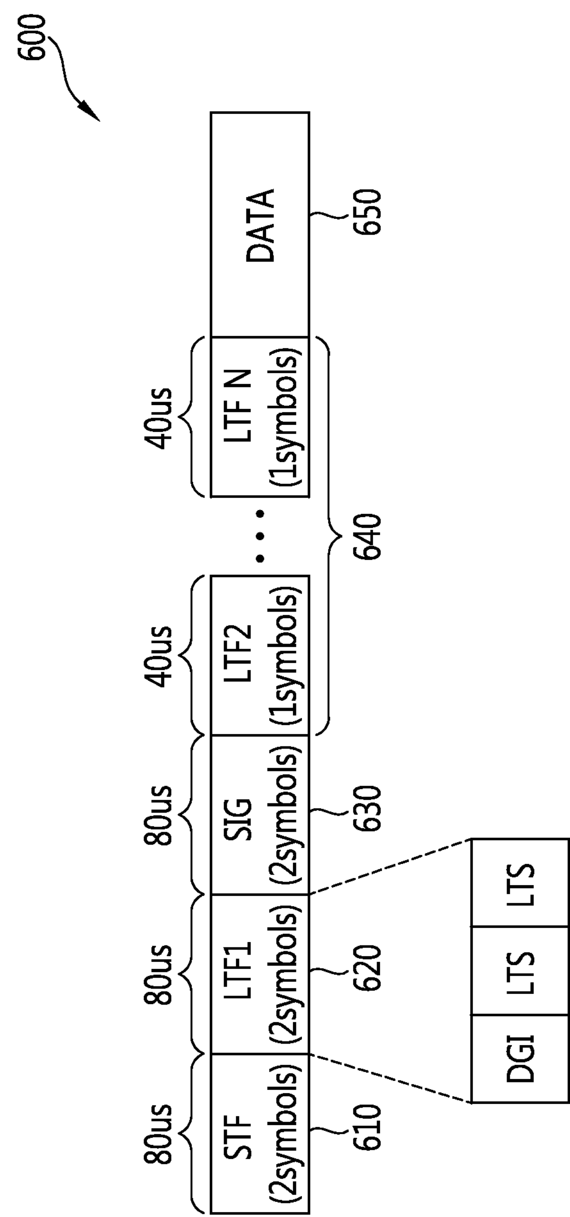
FIG. 6 is a block diagram illustrating an example of the format of a PPDU for transmission through a band of 1 GHz or less in accordance with an embodiment of the present invention.

FIG. 6 is a block diagram illustrating an example of the format of a PPDU for transmission through a band of 1 GHz or less in accordance with an embodiment of the present invention.

Referring to FIG. 6, the PPDU 600 has a structure in which the format of an HT-GF PPDU, such as the sub-figure (c) of FIG. 3, has been 1/10 down-clocked. The PPDU 600 includes an STF 610, an LTF1 620, an SIG field 630, at least one LTF (LTF2 to LTF N 640), and a data field 650.

The STF 610 is used to obtain frame timing and is used for AGC. The STF 610 is formed of two OFDM symbols. Each of the two OFDM symbols has 40 us, and the two OFDM symbols are added to have 80 us OFDM symbol duration.

The LTF1 620 is used for channel estimation. The LTF1 620 includes two OFDM symbols. Each of the two OFDM symbols has 40 us, and the two OFDM symbols are added to have 80 us OFDM symbol duration. The LTF1 includes a Double Guard Interval (DGI) and two Long Training Symbols (LTS)

The SIG field 630 is used to demodulate and decode the data field 640. The SIG field 630 includes two OFDM symbols. Each of the two OFDM symbols has 40 us, and the two OFDM symbols are added to have 80 us OFDM symbol duration.

The at least one LTF 640 is used for channel estimation for the demodulation of the data field 650. Each LTF includes a single OFDM symbol, which has 40 us OFDM symbol duration.

If a PPDU having the format according to FIG. 6 is transmitted, a total of 160 us is taken until the SIG field 630 is transmitted. The PPDU having such a format may be used to send a channel bandwidth of 2 MHz or more.

Figure 7:
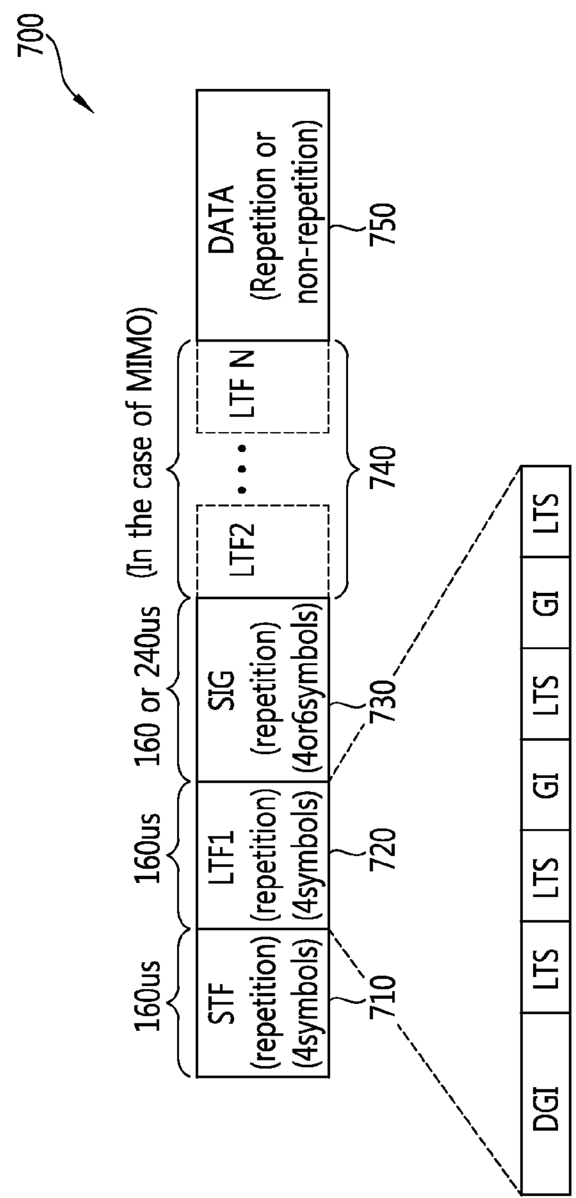
FIG. 7 is a block diagram illustrating an example of the format of a PPDU for 1 MHz-bandwidth transmission in a band of 1 GHz or less in accordance with an embodiment of the present invention.

Meanwhile, for communication of extended coverage, there may be proposed the format of a PPDU, such as FIG. 7, in which each of an STF, an LTF, an SIG, and/or a data field included in a PPDU having a format, such as FIG. 6, has been repeated in a twice or more time or frequency domain.

FIG. 7 is a block diagram illustrating an example of the format of a PPDU for 1 MHz-bandwidth transmission in a band of 1 GHz or less in accordance with an embodiment of the present invention.

Referring to FIG. 7, the PPDU 700 may include an STF 710, an LTF1 720, an SIG field 730, and a data field 750. In addition, in the case of a PPDU for MIMO transmission, one or more LTFs (LTF2 to LTF N) 740) may be further included depending on the number of spatial streams used.

Referring to the STF 710 and the LTF1 720, it may be seen that OFDM symbols are repeatedly formed compared to the STF 610 and the LTF1 620 of FIG. 6. That is, each of the OFDM symbols formed of a bit sequence that originally forms the STF and the LTF1 is repeated.

Accordingly, the STF 710 includes four OFDM symbols. Each of the four OFDM symbols has 40 us, and all of the four OFDM symbols are added to have 160 us OFDM symbol duration. The LTF1 720 also includes four OFDM symbols. Each of the four OFDM symbols has 40 us, and all of the four OFDM symbols are added to have 160 us OFDM symbol duration. That is, if a PPDU, such as FIG. 7, is provided, the transmission time of a preamble part is 320 us, which is twice compared to the case where a PPDU having a format, such as FIG. 6, is transmitted.

Meanwhile, when the LTF1 720 is seen in the time domain, a single LTF1 symbol includes a DGI and two LTSs. If the DGI and two LTSs are simply repeated, they may be configured in order of the DGI, the two LTSs, the DIG, and the two LTSs. In this case, the repeated LTF symbol may be implemented in such a manner that two GIs are applied instead of the DGI. Accordingly, the LTF1 symbol may be configured to include the DIG, the two LTSs, the GI, the LTS, the GI, and the LTS, as shown.

Furthermore, in the SIG field 730, an OFDM symbol may be repeatedly formed, but the SIG field 730 may be formed by repeatedly the OFDM symbols twice or more.

When sending a PPDU through a plurality of spatial streams according to MIMO transmission, the repetition of an OFDM symbol may be applied to or may not be applied to the at least one LTF 740 and the data field 750 that may be included in the PPDU 700.

The format of a PPDU to which the repetition of an OFDM symbol has been applied, as in FIG. 7, may be used to send and receive a frame for wider service coverage using a 1 MHz channel bandwidth.

Meanwhile, in the aforementioned format of a PPDU for 1 MHz bandwidth transmission, information that signals whether or not to apply the repetition of an OFDM symbol to the LTF2 to LTF N and the data field for MIMO transmission may be required. To this end, the MCS subfield of the SIG field may be configured to signal whether or not to apply the repetition of an OFDM symbol.

Hereinafter, it is assumed that that the lowest MCS level not having repetition is MCS 1 and the highest MCS level is MCS 8, for convenience of description. In this case, to generate an MCS level that is one step lower than an existing step by applying OFDM symbol repetition in which an OFDM symbol set to the MCS 1 is repeated in the time domain or frequency domain is called MCS 0. A total of MCS levels include 9 steps from the MCS 0 to the MCS 8. In the case of the MCS 0, OFDM symbol repetition is applied, and thus the total length of symbols become about twice. If the aforementioned PPDU for 1 MHz bandwidth transmission is applied, the STF, the LTF1, and the SIG field of the corresponding PPDU are subject to OFDM symbol repetition and are transmitted. In contrast, at least one LTF (LTF2 to LTF N) and a data field included in the case of MIMO transmission may be or may not be subject to OFDM symbol repetition as described above. Whether or not to apply OFDM symbol repetition may be indicated by an MCS level. That is, when the MCS subfield of the SIG field indicates the MCSO, OFDM repetition symbols are applied to the LTF2 to the LTF N and the data field. When the MCS subfield of the SIG field indicates other MCS levels, each LTF is transmitted in a single OFDM symbol, and the data field may be transmitted in one or more data OFDM symbols without symbol repetition.

Meanwhile, in the case of MIMO transmission, the total length of OFDM symbols in each of the LTF 2 to the LTF N to which OFDM symbol repetition has been applied is increased twice due to the repetition. In such a case, the structure of the increased OFDM symbols may be implemented in various ways. This is described with reference to FIG. 8.

Figure 8:
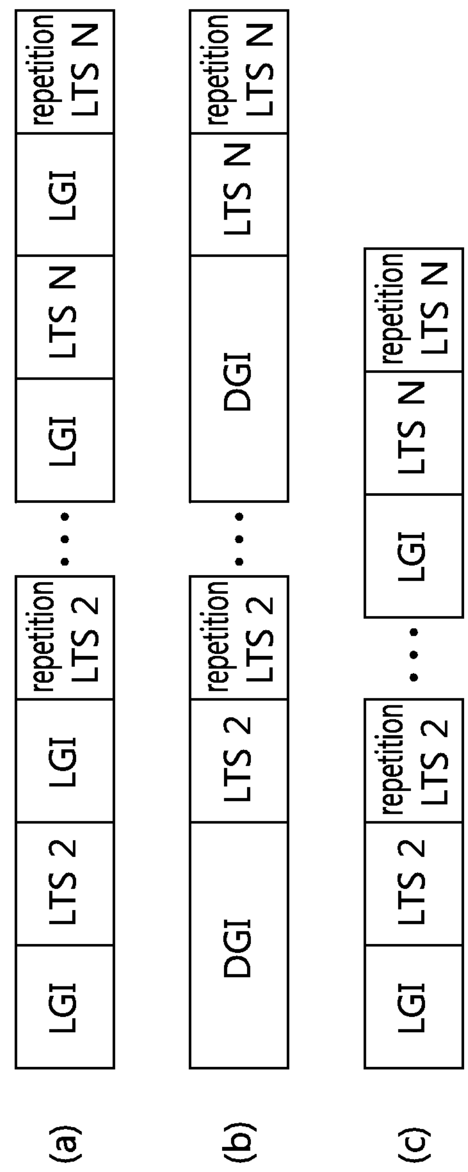
FIG. 8 is a diagram illustrating an example of the structure of OFDM symbols of at least one LTF to which the repetition of an OFDM symbol has been applied in accordance with an embodiment of the present invention.

FIG. 8 is a diagram illustrating an example of the structure of OFDM symbols of at least one LTF to which OFDM symbol repetition has been applied in accordance with an embodiment of the present invention.

1) Insert a Long Guard Interval (LGI) in Front of Each LTS

Referring to a sub-figure (a), in each of an LTF2 to an LTF N, an LGI is inserted in front of each of a corresponding LTS and a repetition LTS (e.g., an LTS 2 and a repetition LTS2, that is, a repeated symbol thereof), transformed in the time domain, as a Cyclic Prefix (CP). Such a method is the straightforward method. In this case, the total length of OFDM symbols is increased twice compared to the case where OFDM symbol repetition is not applied.

2) Insert a DGI

Referring to a sub-figure (b), a DIG corresponding to the total length of existing two LGIs is inserted in front of an LTS N symbol in the time domain. In this case, a method of generating a DIG waveform is to perform copying by the length of the DGI from the end of an LTS N waveform and performing insertion as a CP. In accordance with this method, there is an advantage in a waveform characteristic in which time domain waveforms connected by the DGI-LTS-repetition LTS are continuous without a discontinuous point.

3) Insert a Single LGI

Referring to a sub-figure (c), an LGI is inserted as a CP in front of an LTS N and a repetition LTS N, instead of a DGI. In this case, since the LGI is inserted instead of the DGI, the total length of OFDM symbols is not increased twice due to OFDM symbol repetition. However, such a characteristic is characterized in that the start point of each OFDM symbol is not maintained at the same interval, but is advantageous in that the total transmission time can be reduced by N*LGI.

The format of the PPDU that may be applied to the next-generation WLAN system using a band of 1 GHz or less has been described so far. Meanwhile, in the next-generation WLAN system, an AP may initiate a sounding procedure for beamforming transmission, and STAs may be requested to participate in the sounding procedure initiated by the AP.

Even in the next-generation WLAN system using a 1 MHz bandwidth, a sounding procedure based on an NDP may be supported. That is, after sending an NDPA frame, an AP may send an NDP. An STA may estimate a channel based on the NDP, and may send feedback information to the AP.

The NDPA frame may be transmitted and received in the aforementioned format of a PPDU for 1 MHz bandwidth transmission. That is, OFDM symbol repetition is applied to the STF, the LTF1, and the SIG field of the NDPA frame in a form, such as FIG. 7, and the NDPA frame is then transmitted. In this case, an MCS subfield within the SIG field may be indicative of the MCS level of a subsequent data field, and thus whether or not to apply OFDM symbol repetition to the data field may be indicated by the MCS subfield. Furthermore, in the case of MIMO transmission, whether or not to apply OFDM symbol repetition to at least one LTF (LTF 2 to LTF N) may be indicated by the MCS subfield. If the MCS subfield is indicative of MCSO, the structure of OFDM symbols of the at least one LTF (LTF 2 to LTF N) may be implemented as in FIG. 8.

In this case, if an NDP according to an existing format is applied to the sounding procedure of the next-generation WLAN system without change because OFDM symbol repetition may not be applied to an existing NDP, an STA is unaware of whether OFDM symbol repetition has been applied to at least one LTF for MIMO channel estimation. Accordingly, in order to support an NDP-based sounding procedure in the next-generation WLAN system, a new NDP suitable for the next-generation WLAN system needs to be proposed.

The NDP does not include information (field/subfield) indicative of an MCS level that is related to the OFDM symbol repetition of a subsequent data field, such as an MCS subfield in the SIG field of a common PPDU. That is, the NDP does not have a concept called the MCS level of a data field because it is a PPDU having a special format not having a data field.

Accordingly, the present invention proposes a format in which OFDM symbol repetition is basically applied to at least one LTF (LTF 2 to LTF N) for an MIMO channel in addition to the STF, the LTF1, and the SIG field in the case of an NDP for 1 MHz transmission. That is, OFDM symbol repetition is applied to an NDP for 1 MHz transmission if other signaling is not present, and the format of at least one LTF (LTF2 to LTF N) included in the NDP may be implemented as in FIG. 8.

As another format for an NDP for 1 MHz transmission, a format including a bit field indicative of whether or not to apply OFDM symbol repetition to the SIG field of an NDP may be proposed. The corresponding bit field may be indicative of whether or not to apply OFDM symbol repetition to an at least one LTF (LTF 2 to LTF N) that follows the SIG field. For the format of the corresponding NDP, reference may be made to FIGS. 9 and 10.

Figure 9:
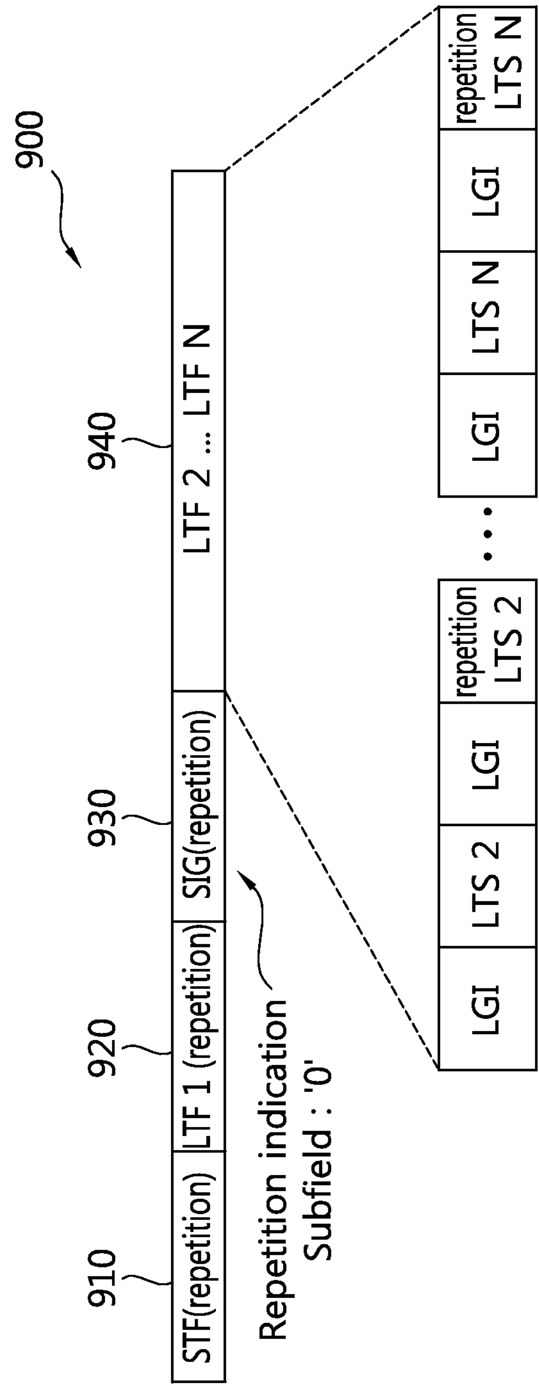
FIGS. 9 and 10 are block diagrams illustrating examples of the format of an NDP in accordance with an embodiment of the present invention.
Figure 10:
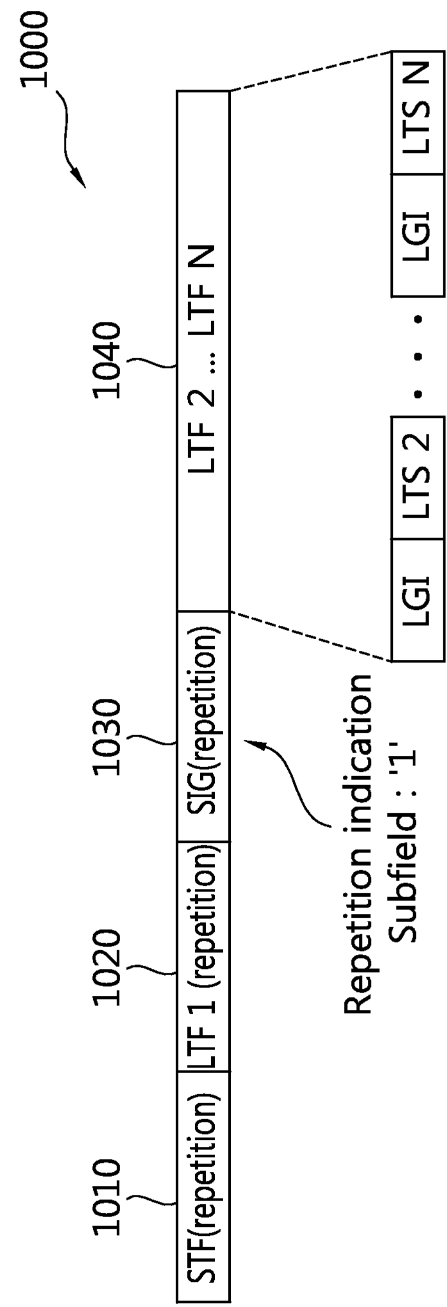

FIGS. 9 and 10 are block diagrams illustrating examples of the format of an NDP in accordance with embodiments of the present invention. FIG. 9 illustrates the format of an NDP in the case where OFDM symbol repetition is applied to at least one LTF (LTF 2 to LTF N). FIG. 10 illustrates the format of an NDP in the case where OFDM symbol repetition is not applied to at least one LTF (LTF 2 to LTF N).

Referring to FIGS. 9 and 10, NDPs 900 and 1000 include STFs 910 and 1010, LTF1s 920 and 1020, SIG fields 930 and 1030, and at least one LTF (LTF2 to LTF N) 940 and 1040, respectively. OFDM symbol repetition is applied to the STFs 910 and 1010, the LTF1s 920 and 1020, and the SIG fields 930 and 1030.

Meanwhile, the SIG field 930 and 1030 include respective repetition indication subfields. The repetition indication subfields are indicative of whether or not OFDM symbol repetition has been applied to the at least one LTF 940 and 1040 subsequent to the SIG fields 930 and 1030.

The repetition indication subfield included in the SIG field 930 of FIG. 9 is indicative that OFDM symbol repetition has been applied to the at least one LTF 940. In such a case, the repetition indication subfield may be set to '0'.

The repetition indication subfield included in the SIG field 1030 of FIG. 10 is indicative that OFDM symbol repetition has been applied to the at least one LTF 1040. In such a case, the repetition indication subfield may be set to '1'.

Meanwhile, the at least one LTF 940 of FIG. 9 to which OFDM symbol repetition has been applied may be implemented so that it is transmitted through OFDM symbols, such as those illustrated in FIG. 9. Furthermore, the at least one LTF 940 of FIG. 9 to which OFDM symbol repetition has been applied may be transmitted through OFDM symbols, as illustrated in the sub-figures (b) and (c) of FIG. 8.

An STA that has received the NDP having the format proposed in FIGS. 9 and 10 in accordance with the embodiments of the present invention format may determine whether or not to apply OFDM symbol repetition to at least one subsequent LTF in response to indication included in the repetition indication subfield included in the SIG field. The STA may estimate a channel based on the at least one LTF in response to the indication of the repetition indication subfield, and may generate a feedback frame including channel state information.

The STA that has estimated the channel based on the NDP generates a feedback frame for 1 MHz transmission. OFDM symbol repetition may be applied to the feedback frame for 1 MHz transmission, as in the format of a PPDU for 1 MHz transmission in accordance with an embodiment of the present invention, and the feedback frame may be then transmitted. That is, OFDM symbol repetition may be applied to the STF, the LTF1, and the SIG field of the feedback frame may be applied, and the feedback frame may be then transmitted. Thereafter, OFDM symbol repetition may be or may not be applied to the at least one LTF and the data field depending on an MCS level indicated by the MCS subfield of the SIG field, and the at least one LTF and the data field may be then transmitted.

Meanwhile, from a viewpoint of an STA that feeds back channel state information, a method of providing support so that the STA automatically detects a transmitted NDP may be proposed. That is, the STA may be supported so that the STA detects that a transmitted PPDU is an NDP in a process of receiving the PPDU transmitted by an AP and demodulating the PPDU. To this end, the format of an NDP applied to channel sounding for 1 MHz transmission and the format of a common PPDU for 1 MHz transmission are proposed as in FIG. 11.

Figure 11:
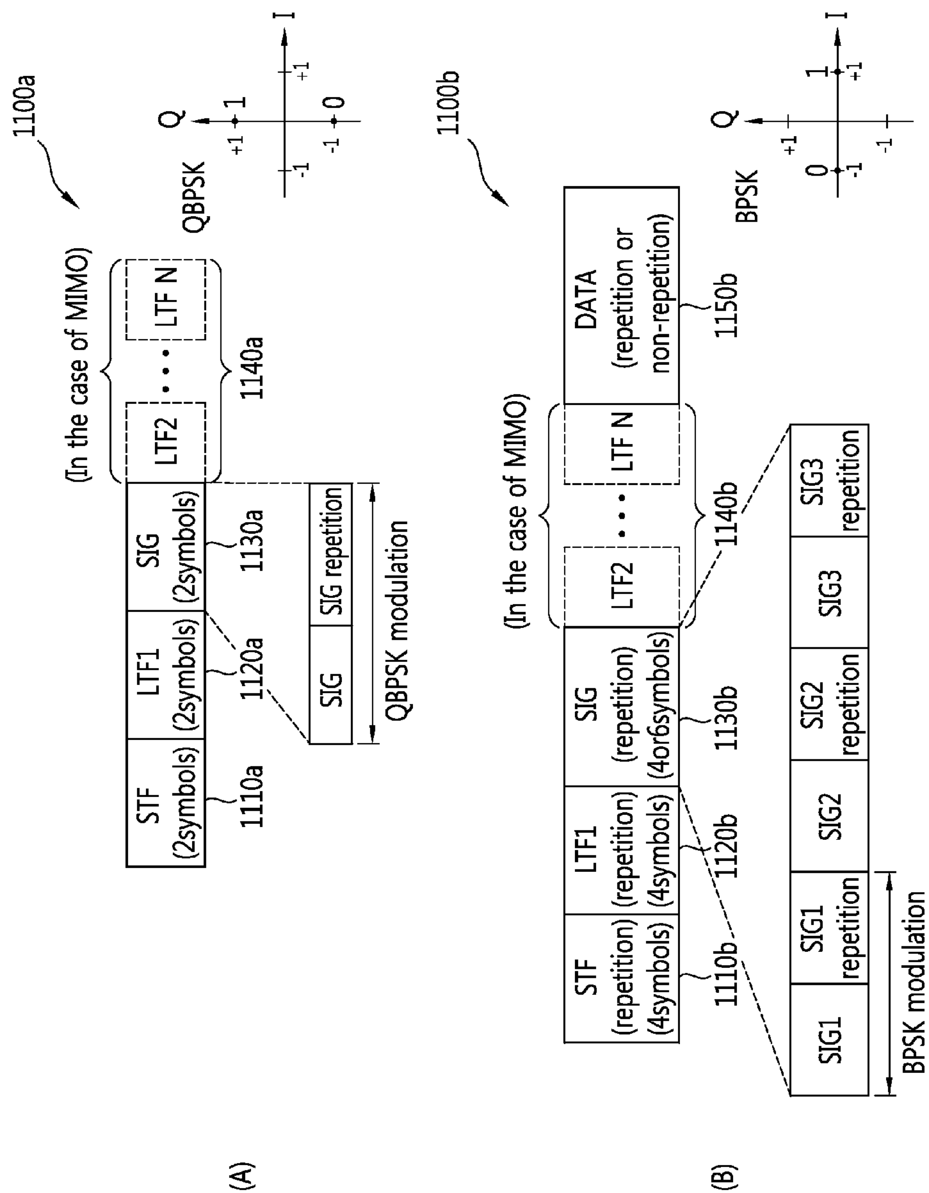
FIG. 11 is a diagram illustrating the format of an NDP for 1 MHz transmission and the format of a common PPDU in accordance with an embodiment of the present invention.

FIG. 11 is a diagram illustrating the format of an NDP for 1 MHz transmission and the format of a common PPDU in accordance with an embodiment of the present invention.

The sub-figure (a) of FIG. 11 illustrates an example of the format of an NDP for 1 MHz transmission. Referring to the sub-figure (a), the NDP 1100*a* includes an STF 1110*a*, an LTF1 1120*a*, and an SIG field 1130*a*, and may further include at least one LTF (LTF2 to LTF N) 1140*a* in the case of MIMO transmission.

The sub-figure (b) of FIG. 11 illustrates an example of the format of a common PPDU for 1 MHz transmission. Referring to the sub-figure (b), the PPDU 1100*b* includes an STF 1110*b*, an LTF1 1120*b*, an SIG field 1130*b*, and a data field 1150*b*, and may further include at least one LTF (LTF2 to LTF N) 1140*b* in the case of MIMO transmission.

The function of each of the fields illustrated in the sub-figure (a) and the sub-figure (b) has been described above, and a description thereof is omitted.

OFDM symbol repetition is applied to the NDP and the common PPDU according to the sub-figures (a) and (b). Accordingly, the STF 110*a*, 1110*b* is transmitted through four OFDM symbols, and the LTF1 1120*a*, 1120*b* is transmitted through four OFDM symbols. Furthermore, OFDM symbol repetition may be selectively applied to the at least one LTF 1140*a*, 1140*b* and the data field 1150*b*.

Meanwhile, an AP that sends the NDP 1100*a* applies QBPSK to an SIG symbol, that is, the first OFDM symbol for the SIG field 1130*a*, and an SIG repetition symbol, that is, the second OFDM symbol, as a modulation scheme. QBPSK is the counter clock-wise 90-degree phase rotation of constellation mapping according to BPSK. In contrast, the AP may apply BPSK to the OFDM symbols for the SIG field 1130*b* of the common PPDU 1100*b* as a modulation scheme. Accordingly, the OFDM symbols for the SIG field 1130*a* of the NDP 1100*a* is subject to 90-degree phase rotation compared to the OFDM symbols for the SIG field 1130*b* of the common PPDU 1100*b*.

Accordingly, a reception STA may be aware that a corresponding PPDU is the NDP 1100*a* by detecting the modulation scheme applied to the OFDM symbols of the received NDP 1100*a*. The format of such a NDP enables an ST to automatically detect the NDP.

If the format of the NDP proposed as described is applied, the SIG field of the NDP may be formed of only two OFDM symbols and then transmitted. The SIG field of the aforementioned PPDU of FIG. 7 is transmitted through four or six OFDM symbols. Accordingly, there is an advantage in that overhead can be reduced because OFDM symbols for an SIG field are reduced. Although the size of the SIG field of an NDP is reduced and thus the number of OFDM symbols is reduced, the NDP for normal channel sounding can be provided because the contents of the SIG field are indicative that a corresponding PPDU is the NDP.

In the example of FIG. 11, QBPSK has been illustrated as being applied to the SIG field of the NDP and BPSK has been illustrated as being applied to the SIG field of the common PPDU, but BPSK may be applied to the SIG field of the NDP and QBPSK may be applied to the SIG field of the common PPDU. That is, in sending the NDP for channel sounding, an AP may apply, to two OFDM symbols for the signal field of the NDP, a modulation scheme for performing 90-degree phase rotation on constellation mapping compared to constellation mapping according to a modulation scheme that is applied to the OFDM symbols for the SIG field of the common PPDU. If the AP sends the NDP in this manner, an STA may automatically detect the NDP based on whether or not 90-degree phase rotation has been applied.

In order to apply a method of automatically detecting, by an STA, the NDP through a difference in the modulation of QBPSK and/or BPSK for the first two OFDM symbols of an SIG field of the NDP, information included in the SIG field of the NDP needs to be controlled. The reason for this is that in the format of an NDP, such as FIG. 11, the SIG field is transmitted through two OFDM symbols and one of the first two OFDM symbols is an OFDM symbol generated by repeating the same bit sequence. An SIG field into which this has been incorporated may be implemented as in Table 6 below.

TABLE 6

| Subfield | Number of bits | Description |
|---|---|---|
| $N_{SS}$ | 2 | Number of spatial streams |
| CRC | 4 | |
| Tail | 6 | |
| Total | 12 | |

A modulation scheme using 90-degree phase rotation compared to the OFDM symbols for the SIG field of the common PPDU is applied to the OFDM symbols for the SIG field of the NDP for 1 MHz.

Meanwhile, since information about the number of spatial streams can be provided through the subfield of the number of spatial streams $N_{SS}$ of the SIG field configured as above, a reception STA may determine whether or not an OFDM symbol for at least one LTF is present after the transmission of two OFDM symbols for the SIG field based on the information. More specifically, if the $N_{SS}$ subfield included in the SIG field is indicative of the number of a plurality of spatial streams, the reception STA may determine that OFDM symbols for an LTF will be transmitted after OFDM symbols for the SIG field of an NDP, and may also determine the number of OFDM symbols for the LTF.

In accordance with the format of the PPDU and the format of the NDP described with reference to the drawings in accordance with the embodiments of the present invention, OFDM symbol repetition is applied when sending the SIG field. Furthermore, 90-degree phase rotation has been applied between the OFDM symbols according to the modulation scheme applied to the SIG field of the common PPDU and the OFDM symbols according to the modulation scheme applied to the SIG field of the NDP.

In receiving repeated OFDM symbols, an STA may extract a 3-dB SNR gain according to a noise averaging effect by combining the signal waveforms of OFDM symbols for an SIG field and repeated OFDM symbols. After obtaining the 3-dB SNR gain, the STA performs 1-tap equalization on the SIG field based on a channel coefficient per tone that has been estimated after channel estimation through an LTF. Next, the STA may automatically detect an NDP by determining which modulation scheme of BPSK and QBPSK has been applied through the phase distribution of the remaining complex constellation per tone.

Meanwhile, an STA may generate channel state information by performing channel estimation based on the aforementioned NDP in accordance with an embodiment of the present invention. In this case, the channel state information may be implemented as a channel information field and a channel information control field. The channel information control field includes information required to interpret detailed channel state information that is included in the channel information field. For a representative example, the channel information control field includes a channel bandwidth subfield and a grouping subfield. The channel bandwidth subfield is indicative of the bandwidth of an estimated channel, and the grouping subfield is indicative of subcarrier grouping used for a beamforming feedback matrix.

The channel information field may include the at least one beamforming feedback matrix of at least one subcarrier as the results of channel estimation. Accordingly, the beamforming feedback matrix included in the channel information field may be determined based on the characteristics of a 1 MHz bandwidth channel of a band of 1 GHz or less, that is, a basis for the operation of the next-generation WLAN system. In the next-generation WLAN system, a 1 MHz channel band is used, but a single OFDM symbol is implemented to include 32 subcarriers. Furthermore, a pilot is inserted into subcarriers corresponding to subcarrier indices −7 and 7. Accordingly, such characteristics of the next-generation WLAN system in the physical layer are incorporated into at least one beamforming feedback matrix of the channel information field.

The at least one beamforming feedback matrix is calculated with respect to at least one subcarrier, and is included in the channel information field. The subcarrier related to the beamforming feedback matrix may be specified as in Table 7 below.

TABLE 7

| Channel bandwidth | Subcarrier Grouping (Ng) | Number of subcarrier (Ns) | Subcarriers scidx(0) . . . scidx(Ns − 1) for beamforming feedback matrix that is fed back |
|---|---|---|---|
| 1 MHz | 1 | 24 | −13, −12, −11, −10, −9, −8, −6, −5, −4, −3, −2, −1, 1, 2, 3, 4, 5, 6, 8, 9, 10, 11, 12, 13 |
| | 2 | 12 | −13, −11, −9, −5, −3, −1, 1, 3, 5, 9, 11, 13 |
| | 4 | 8 | −13, −9, −5, −1, 1, 5, 9, 13 |
| | 8 | 6 | −13, −5, −1, 1, 5, 13 or −13, −9, −1, 1, 9, 13 |

The Ns means a total number of subcarriers related to the at least one beamforming feedback matrix, and the Ns may be differently set depending on the subcarrier grouping Ng. A beamforming feedback matrix is calculated with respect to an Ns number of subcarriers, and the calculated beamforming feedback matrix is included in the channel information field. Meanwhile, subcarriers corresponding to a subcarrier index 0 are subcarriers for DC tone, and subcarriers corresponding to subcarrier indices −7 and +7 are subcarriers for pilot. Thus, a beamforming feedback matrix is omitted with respect to the corresponding subcarriers.

Meanwhile, a beamforming feedback matrix may be calculated in such a manner that the interval between the indices of Table 7 is increased twice. In such a case, subcarriers related to the beamforming feedback matrix may be specified as in Table 8 below.

TABLE 8

| Channel bandwidth | Subcarrier grouping (Ng) | Number of subcarriers (Ns) | Subcarriers scidx(0) . . . scidx(Ns − 1) for beamforming feedback matrix that is fed back |
|---|---|---|---|
| 1 MHz | 1 | 24 | −13, −11, −9, −5, −3, −1, 1, 3, 5, 9, 11, 13 |
| | 2 | 12 | −13, −9, −5, −1, 1, 5, 9, 13 |
| | 4 | 8 | −13, −5, −1, 1, 5, 13 or −13, −9, −1, 1, 9, 13 |
| | 8 | 6 | −13, −1, 1, 13 |

Table 8 corresponds to an example in which feedback complexity has been reduced by taking into consideration the characteristics of the physical layer of the next-generation WLAN system that uses a narrower bandwidth than existing WLAN systems.

Meanwhile, a method of mixing the contents of the subcarrier mapping tables illustrated in Table 7 and Table 8 may also be proposed. For example, the Ng value may not have the four values of 1, 2, 4 and 8 as proposed in Table 7 and Table 8, but yet another grouping value may be indicated. The number of subcarriers may be changed depending on the Ng value, and thus the indices of subcarriers related to a beamforming feedback matrix may be changed.

An AP that has received a feedback frame including the channel state information implemented as described above may be aware that a beamforming feedback matrix has been fed back to subcarriers corresponding to a specific index as in Table 7 or Table 8, and may perform the transmission and reception of a subsequent frame based on the beamforming feedback matrix for provided subcarriers.

In addition, a method of splitting the entire channel bandwidth into several sub-bands and applying a different Ng (or Ns) value to the bandwidth of each sub-channel without being applied to the entire channel bandwidth is proposed as a method of changing a total number of subcarriers on which a beamforming feedback matrix needs to be calculated depending on the Ng and/or Ns values.

Figure 12:
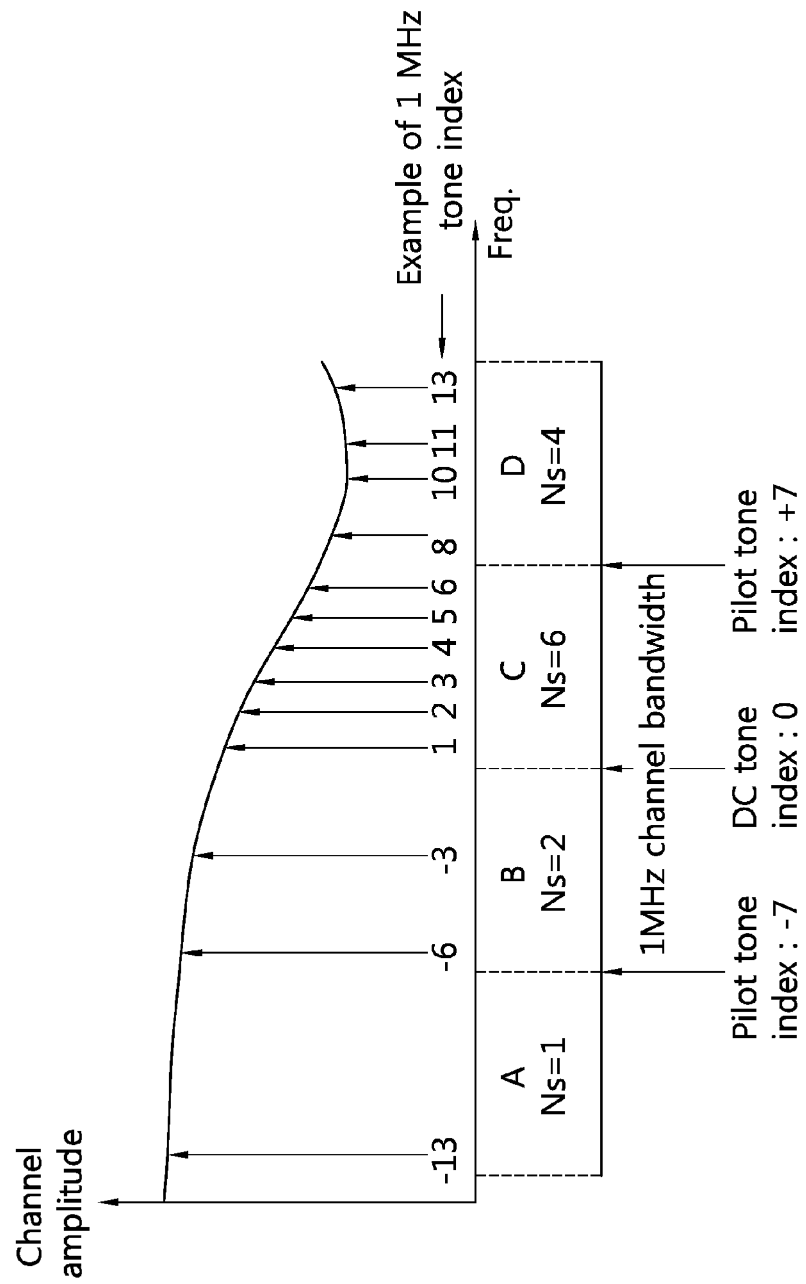
FIG. 12 is a diagram illustrating an example of the selection of subcarriers related to a beamforming feedback matrix in accordance with an embodiment of the present invention.

FIG. 12 is a diagram illustrating an example of the selection of subcarriers related to a beamforming feedback matrix in accordance with an embodiment of the present invention.

Referring to FIG. 12, a 1 MHz channel band is classified into a total of four sub-bands (sub-band to sub-band), and a different Ns is set in each sub-band. Accordingly, channel state information can be more efficiently compressed because the number of subcarriers related to a beamforming feedback matrix to be fed back is changed in each section. A detailed example of the Ns value that may be applied to each section may be illustrated as in Table 9 below.

TABLE 9

| Channel bandwidth | Sub-band | Number of subcarriers (Ns) | Subcarriers scidx(0) . . . scidx(Ns − 1) for beamforming feedback matrix that is fed back |
|---|---|---|---|
| 1 MHz | A | 1 | −13 |
| | | 2 | −13, |
| | | 4 | −13, −11, −10, −8 |
| | | 6 | −13, −12, −11, −10, −9, −8 |
| | B | 1 | −6 |
| | | 2 | −6, −3 |

TABLE 9-continued

| Channel bandwidth | Sub-band | Number of subcarriers (Ns) | Subcarriers scidx(0) . . . scidx(Ns − 1) for beamforming feedback matrix that is fed back |
|---|---|---|---|
| | | 4 | −6, −4, −3, −1 |
| | | 6 | −6, −5, −4, −3, −2, −1 |
| | C | 1 | 6 |
| | | 2 | 3, 6 |
| | | 4 | 1, 3, 4, 6 |
| | | 6 | 1, 2, 3, 4, 5, 6 |
| | D | 1 | 13 |
| | | 2 | 10, 13 |
| | | 4 | 8, 10, 11, 13 |
| | | 6 | 8, 9, 10, 11, 12, 13 |

Meanwhile, the example described with reference to FIG. 12 and Table 9 is only an example in which a 1 MHz channel band is classified into a plurality of sub-bands and the number of subcarriers on which a beamforming feedback matrix is calculated is differently set in each sub-band. Referring to Table and the drawing, in the embodiment of the present invention, the entire channel band may be divided into a section having high frequency selectivity and a section having small frequency selectivity for each sub-carrier index, coarse feedback may be performed by applying a small Ns to a section having a small change, and fine feedback may be performed by applying a high Ns to a section having a great change. Accordingly, in addition to the method of splitting the 1 MHz channel band into four sub-band like the sub-bands A to D, the 1 MHz channel band may be classified into larger sub-bands or smaller sub-bands, and the number of Ns applied to each sub-band may also be changed.

Figure 13:
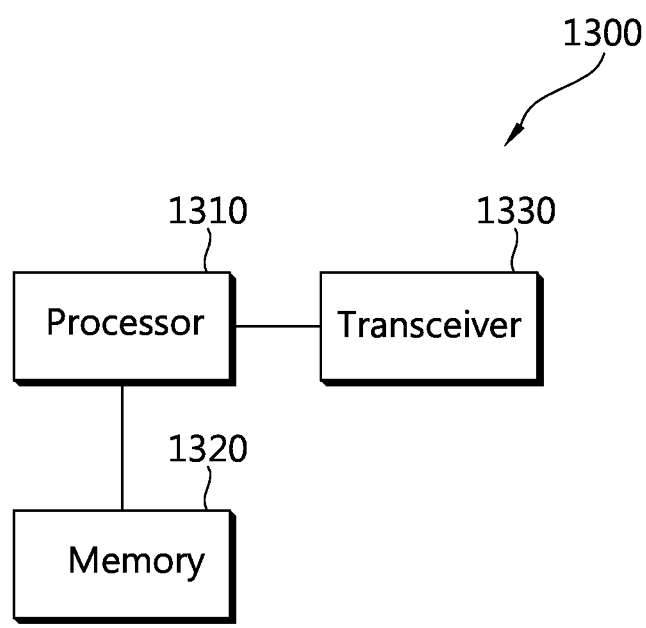
FIG. 13 is a block diagram illustrating a wireless apparatus in which an embodiment of the present invention may be implemented.

FIG. 13 is a block diagram illustrating a wireless apparatus in which an embodiment of the present invention may be implemented.

Referring to FIG. 13, a wireless apparatus 1300 includes a processor 1310, memory 1320, and a transceiver 1330. The transceiver 1330 sends and/or receives radio signals, but implements the physical layer of IEEE 802.11. The processor 1310 may be functionally connected to the transceiver 1330 and configured to operate therewith. The processor 1310 may be configured to generate the data units of the formats according to FIGS. 6 and 7. The processor 1310 may be configured to generate the NDPs according to FIGS. 8 to 11 and send and receive the NDPs. The processor 1310 may be configured to perform the channel sounding methods of FIGS. 5 to 12 in accordance with the embodiments of the present invention.

The processor 1310 and/or the transceiver 1330 may include an Application-Specific Integrated Circuit (ASIC), another chipset, a logic circuit and/or a data processor. When an embodiment is implemented by software, the above scheme may be implemented by a module (procedure, function and the like) to perform the above function. The module is stored in the memory 1320 and may be executed by the processor 1310. The memory 1320 may be included inside the processor 1310. The memory 1320 is separately located outside the processor 1310 and may be functionally connected to the processor 1310 by various means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting data in a wireless local area network, the method comprising:
- generating a physical layer protocol data unit (PPDU) for a 1 MHz bandwidth, the PPDU including a short training field (STF), a long training field (LTF), a signal field and a data field; and
- transmitting the PPDU over the 1 MHz bandwidth,
- wherein the signal field includes a plurality of first bit sequences that is transmitted through a plurality of first orthogonal frequency division multiplexing (OFDM) symbols,
- wherein each of the first bit sequences is repeated for a corresponding one of the plurality of first OFDM symbols,
- wherein the plurality of first bit sequences includes modulation and coding scheme (MCS) information used to modulate the data field,
- wherein an MCS index corresponding to an MCS level is used to indicate whether or not to apply OFDM symbol repetition,
- wherein, if the MCS information is set to a first MCS index, the data field is generated by a binary convolutional code (BCC) encoding with repetition, and
- wherein, if the MCS information is set to a second MCS index, the data field is generated by the BCC encoding with no repetition.

2. The method of claim 1, wherein the data field includes a plurality of second bit sequences that is transmitted through a plurality of second OFDM symbols.

3. The method of claim 2, wherein, when the data field is generated by the BCC encoding with repetition, each of the second bit sequences is BCC-encoded and then is repeated for a corresponding one of the plurality of second OFDM symbols.

4. The method of claim 2, wherein, when the data field is generated by the BCC encoding with no repetition, each of the second bit sequences is BCC-encoded.

5. The method of claim 1, wherein the first MCS index has a higher value than the second MCS index.

6. The method of claim 1, wherein the plurality of first OFDM symbols include six OFDM symbols.

7. A device for a wireless local area network, the device comprises:
- a transceiver that transmits and receives radio signals; and
- a processor, functionally connected with the transceiver, that:

generates a physical layer protocol data unit (PPDU) for a 1 MHz bandwidth, the PPDU including a short training field (STF), a long training field (LTF), a signal field and a data field; and controls the transceiver to transmit the PPDU over the 1 MHz bandwidth, wherein the signal field includes a plurality of first bit sequences that is transmitted through a plurality of first orthogonal frequency division multiplexing (OFDM) symbols, wherein each of the first bit sequences is repeated for a corresponding one of the plurality of first OFDM symbols, wherein the plurality of first bit sequences includes modulation and coding scheme (MCS) information used to modulate the data field, wherein an MCS index corresponding to an MCS level is used to indicate whether or not to apply OFDM symbol repetition, wherein, if the MCS information is set to a first MCS index, the data field is generated by a binary convolutional code (BCC) encoding with repetition, and wherein, if the MCS information is set to a second MCS index, the data field is generated by the BCC encoding with no repetition.

8. The device of claim 7, wherein the data field includes a plurality of second bit sequences that is transmitted through a plurality of second OFDM symbols.

9. The device of claim 8, wherein, when the data field is generated by the BCC encoding with repetition, each of the second bit sequences is BCC-encoded and then is repeated for a corresponding one of the plurality of second OFDM symbols.

10. The device of claim 8, wherein, when the data field is generated by the BCC encoding with no repetition, each of the second bit sequences is BCC-encoded.

11. The device of claim 7, wherein the first MCS index has a higher value than the second MCS index.

12. The device of claim 7, wherein the plurality of first OFDM symbols include six OFDM symbols.

* * * * *